(12) United States Patent
Zhou et al.

(10) Patent No.: US 10,700,571 B2
(45) Date of Patent: Jun. 30, 2020

(54) COOLING SYSTEM FOR VEHICLE MOTOR DRIVE

(71) Applicant: Toyota Motor Engineering & Manufacturing North America, Inc., Erlanger, KY (US)

(72) Inventors: Feng Zhou, South Lyon, MI (US); Ercan Mehmet Dede, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 156 days.

(21) Appl. No.: 15/836,016

(22) Filed: Dec. 8, 2017

(65) Prior Publication Data

US 2019/0181717 A1 Jun. 13, 2019

(51) Int. Cl.
| | |
|---|---|
| *H02K 9/00* | (2006.01) |
| *H02K 5/20* | (2006.01) |
| *H02K 11/33* | (2016.01) |
| *H02K 9/22* | (2006.01) |
| *H02K 9/19* | (2006.01) |

(52) U.S. Cl.
CPC .............. *H02K 5/20* (2013.01); *H02K 9/22* (2013.01); *H02K 11/33* (2016.01); *H02K 9/19* (2013.01); *H02K 2213/12* (2013.01)

(58) Field of Classification Search
CPC . H02K 11/33; H02K 5/20; H02K 9/19; H02K 9/22
See application file for complete search history.

(56) References Cited

U.S. PATENT DOCUMENTS

| | | |
|---|---|---|
| 5,491,370 A | 2/1996 | Schneider et al. |
| 6,198,183 B1 | 3/2001 | Baeumel et al. |
| 6,930,417 B2 | 8/2005 | Kaneko et al. |
| 7,049,716 B2 | 5/2006 | Gründl et al. |
| 7,102,260 B2 | 9/2006 | Takenaka et al. |
| 8,482,919 B2 | 7/2013 | Dede |
| 8,922,073 B2 | 12/2014 | Chun et al. |
| 9,337,706 B2 | 5/2016 | Miyama et al. |
| 9,445,526 B2 | 9/2016 | Zhou et al. |
| 2003/0213580 A1* | 11/2003 | Philpott ................ F28F 3/04 165/46 |
| 2005/0200001 A1* | 9/2005 | Joshi .................... F28F 3/08 257/712 |

(Continued)

*Primary Examiner* — Yuriy Semenenko
(74) *Attorney, Agent, or Firm* — Christopher G. Darrow; Darrow Mustafa PC

(57) ABSTRACT

A cooling system is provided with a plurality of layered assemblies for simultaneously cooling both a power module and a vehicle motor. A first layer, a second layer, and a third layer each define upper and lower opposing major surfaces, and are positioned in a stacked arrangement and configured to provide a flow of coolant fluid from a fluid inlet, defined in the third layer, through an inner region of the second layer, and to a heat sink feature disposed in the first layer. The coolant fluid is then directed back through an outer region of the second layer and to a fluid outlet defined in the third layer. The first layer is in thermal communication with one of the power module and the vehicle motor; the third layer is in thermal communication with the other of the power module and the vehicle motor.

9 Claims, 15 Drawing Sheets

(56) References Cited

U.S. PATENT DOCUMENTS

2012/0274158 A1* 11/2012 Chun .................... B60L 3/003
310/53
2015/0348869 A1* 12/2015 Joshi .................. H01L 23/4735
361/700

* cited by examiner

COOLING SYSTEM FOR VEHICLE MOTOR DRIVE

TECHNICAL FIELD

The present disclosure generally relates to cooling systems and, more particularly, to a power electronics cooling system for the simultaneous cooling of both a vehicle motor and a power module.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Many components of electric and hybrid vehicles, such as power electronic devices and the vehicle motor, may require cooling during operation. Heat management devices have been used, coupled to a heat generation device, such as a power electronics device, to remove heat and lower the operating temperature of the power electronics device. For example, a cooling fluid may be introduced to the heat management device, where it receives heat from the heat management device, primarily through convective and/or conductive heat transfer. The cooling fluid is then removed from the heat management device, thereby removing heat from the power electronics device. However, since the thermal demands of a power electronics device and a vehicle motor may vary due to heat flux differences, a unified cooling system that efficiently accommodates both power electronics devices, as well as a vehicle motor, is complicated.

Various cooling processes have been proposed and attempted. However, certain attempts have been met with varying degrees of limited success, either in the effectiveness in the removal of heat and/or in the complex and costly design of the cooling system. Accordingly, there remains a need for an improved way of cooling components of electric vehicles.

This section provides a general summary of the disclosure, and is not a comprehensive disclosure of its full scope or all of its features.

In various aspects, the present teachings provide a cooling system for simultaneously cooling both a power module and a vehicle motor. The cooling system includes a vehicle motor housing and a plurality of manifolds in thermal communication with the vehicle motor housing. Each manifold defines a cooling fluid inlet, a cooling fluid outlet, and a distribution recess providing fluid communication between the cooling fluid inlet and the cooling fluid outlet. The distribution recess may be defined by a wall having an exterior major surface in thermal communication with the vehicle motor. A manifold fluid insert may be disposed within the distribution recess, defining a plurality of inlet branch channels and outlet branch channels. A power module may be coupled to the manifold, and a first heat sink feature disposed between the power module and the manifold fluid insert. A flow of coolant fluid is provided from each cooling fluid inlet, through the inlet branch channels of the manifold fluid insert for impingement with the first heat sink feature. The coolant fluid is then returned through the outlet branch channels of the manifold fluid insert and to the cooling fluid outlet of the respective manifold.

In other aspects, the present teachings provide a cooling system including a plurality of layered assemblies for simultaneously cooling both a power module and a vehicle motor. Each layered assembly may include a first layer defining upper and lower opposing major surfaces. The upper major surface of the first layer includes a heat sink feature in thermal communication with one of the power module and the vehicle motor. A second layer is provided defining upper and lower opposing major surfaces. The upper major surface of the second layer is located adjacent to the lower major surface of the first layer. A third layer is provided defining upper and lower opposing major surfaces. The upper major surface of the third layer is located adjacent to the lower major surface of the second layer, and the lower major surface of the third layer is in thermal communication with the other of the power module and the vehicle motor. The first layer, the second layer, and the third layer are positioned in a stacked arrangement and configured to provide a flow of coolant fluid from a fluid inlet, defined in the third layer, through an inner region of the second layer, and to the heat sink feature disposed in the first layer. The coolant fluid is then directed back through an outer region of the second layer and to a fluid outlet defined in the third layer.

In still other aspects, the present teachings provide a modular cooling system for simultaneously cooling both a power module and a vehicle motor. The modular cooling system may include a plurality of cooling assemblies. Each cooling assembly may include a first cooling structure defining at least one major surface in thermal communication with the vehicle motor. A second cooling structure may be provided, defining at least one major surface in thermal communication with a power module. An interlayer structure may be provided, configured to couple the first cooling structure to the second cooling structure. The first cooling structure, the second cooling structure, and the interlayer structure may be positioned in a stacked arrangement and configured to provide a flow of coolant fluid from a fluid inlet defined in first cooling structure, through the interlayer structure, and to at least one heat sink feature of the second cooling structure. The coolant fluid is then directed through a fluid outlet defined in the second cooling structure.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology provides systems and methods for power electronics cooling that are configured to simultaneously cool both a power module and a vehicle motor (e.g., the stator of the vehicle motor). In various aspects, this technology may be directed to a vehicle motor for an electric or hybrid vehicle. The beneficial unified cooling of two or more heat generating devices can be accomplished by providing cooling assemblies disposed adjacent a vehicle motor housing, in thermal communication with the vehicle motor on one side, and in thermal communication with a power module on an opposite side. The cooling assemblies may direct a flow of a coolant fluid to concurrently remove heat from the two or more heat generating devices. In certain aspects, the cooling assemblies may be integrated with the vehicle motor itself, in one example, integrated with the vehicle motor housing adjacent the stator. In other aspects, the technology provides for a plurality of modular cooling assemblies that may be coupled to the vehicle motor and, in particular, coupled to the vehicle motor housing.

For simplicity, the heat generating devices useful with the present technology, other than the vehicle motor (stator), are generally referred to herein as power modules. Power modules may include, but are not limited to, inverters and capacitors, electronics devices such as semiconductor devices, insulated gate bipolar transistors (IGBT), metal-oxide-semiconductor field effect transistors (MOSFET), power diodes, power bipolar transistors, power thyristor devices, and the like. The power module may be a component in an inverter and/or converter circuit used to electrically power high load devices, such as electric motors in electrified vehicles (e.g., hybrid vehicles, plug in hybrid electric vehicles, plug in electric vehicles, and the like).

Figure 1A:
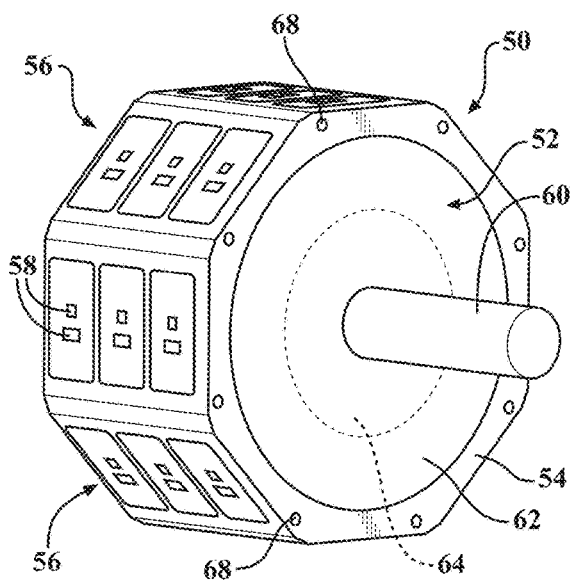
FIG. 1A is an isometric view of an exemplary vehicle motor and vehicle motor housing having a cooling system with a plurality of assemblies for simultaneously cooling both power modules and a vehicle motor.

For a general understanding of the environment of the present technology, FIG. 1A provides an isometric view of an exemplary assembly 50 including a vehicle motor 52 and vehicle motor housing 54 having a cooling system with a plurality of cooling assemblies 56 for simultaneously cooling both a plurality of power modules 58 and the vehicle motor 52. Generally, the vehicle motor 52 may include various standard components, such as a shaft 60, rotor 62, stator 64, and vehicle motor housing (stator housing) 54. It should be understood that the various internal details of vehicle motor 52 are not shown for simplicity. In various aspects, the power modules 58 may ultimately be coupled to vehicle motor housing 54, such that rotation of the shaft 60 and rotor 62 do not rotate the power modules 58.

Figure 1B:
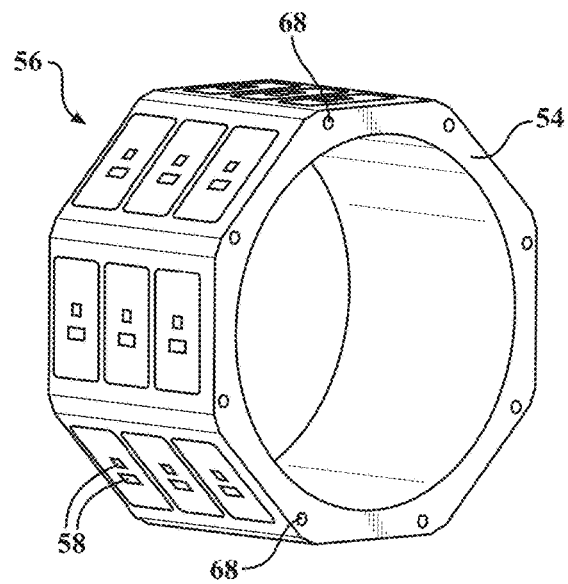
FIG. 1B is an isometric view of the vehicle motor housing and cooling system of FIG. 1A.
Figure 1C:
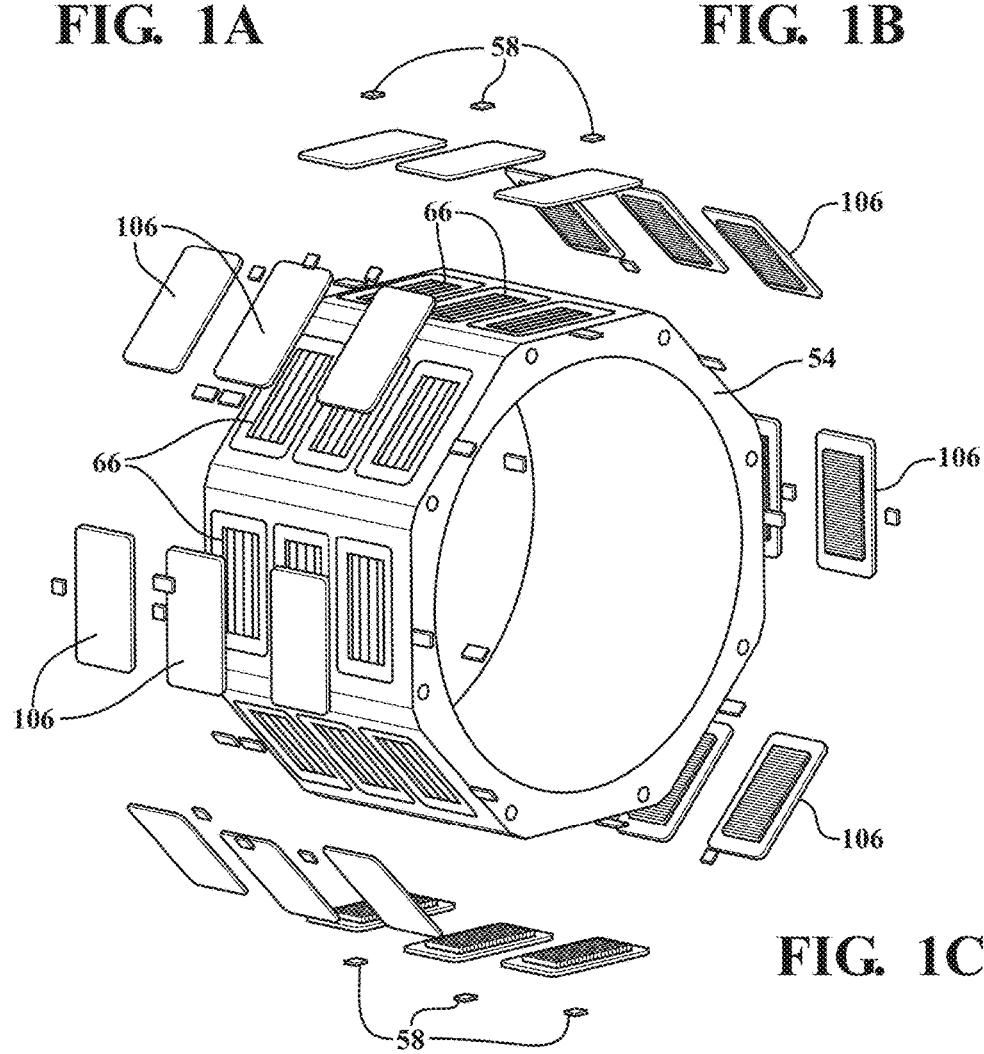
FIG. 1C is an exploded, isometric view of the vehicle motor housing and cooling system of FIG. 1B illustrating a plurality of manifolds and conduits integrally formed as part of the vehicle motor housing.
Figure 2:
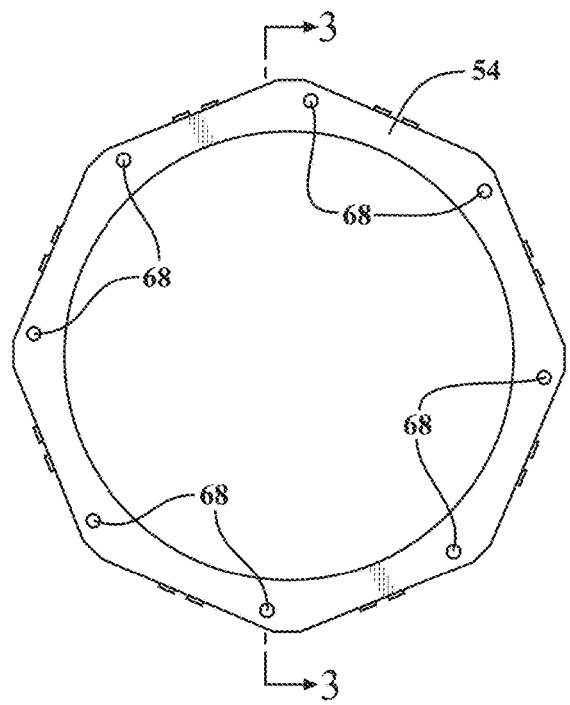
FIG. 2 is a side plan view of the vehicle motor housing of FIG. 1B having the plurality of integral manifolds and conduits.
Figure 3:
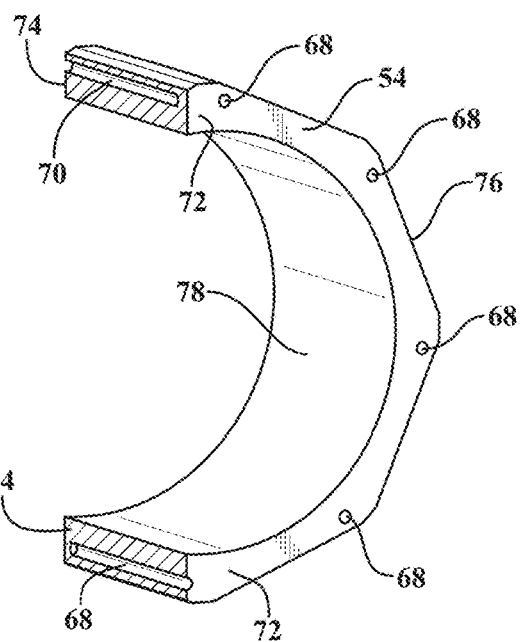
FIG. 3 is an isometric, partial cross-sectional view the vehicle motor housing of FIG. 2 taken along the line 3-3.

FIG. 1B is an isometric view of the vehicle motor housing 54 and cooling system of FIG. 1A without the internal components of the vehicle motor 52. FIG. 1C is an exploded, isometric view of the vehicle motor housing 54 and cooling system of FIG. 1B, further illustrating the cooling assemblies 56 including a plurality of integral manifolds 66, cooling fluid inlets 68, and cooling fluid outlets 70 integrally formed as part of the vehicle motor housing 54. FIG. 2 is a side plan view of the vehicle motor housing 54 of FIG. 1B having the plurality of integral manifolds 66 and cooling fluid inlets 68 and outlets 70. FIG. 3 is an isometric, partial cross-sectional view the vehicle motor housing 54 of FIG. 2 taken along the line 3-3. In certain aspects, as specifically shown in FIG. 3, it may be desirable for the cooling fluid inlets 68 to be provided on a first side 72 of the vehicle motor housing 54, and the cooling fluid outlets 70 to be provided on a second side 74 of the vehicle motor housing 54, opposite from the first side 72. It should be understood that in other aspects, the arrangement may be the opposite, and in still other aspects, the cooling fluid inlets 68 and outlets 70 may be provided on the same side of the vehicle motor housing 54. While the vehicle motor housing 54 is shown have an exterior perimeter 76 generally shaped as an octagon with eight sides having cooling assemblies 56, and a substantially circular interior perimeter 78 that would be in thermal contact with the stator 64, other shapes may be feasible or preferred.

The coolant fluid may be any appropriate liquid, such as deionized water or radiator fluid, and may be stored in an appropriate cooling fluid reservoir (not shown). Other non-limiting, exemplary coolant fluids include water, organic solvents, inorganic solvents, and mixtures thereof. Examples of such solvents may include commercial refrigerants such as R-134a, R717, and R744. Selection of the composition of the coolant fluid used in association with various power modules and vehicle motor types may be selected based on, among other properties, the boiling point, the density, and the viscosity of the coolant fluid. In various examples, the coolant fluid may be directed in a jet in one or more localized region at a high velocity such that the coolant fluid impinges a surface of the heat sink feature and/or heat sink plate thermally coupled to at least one heat generating device.

Figure 4:
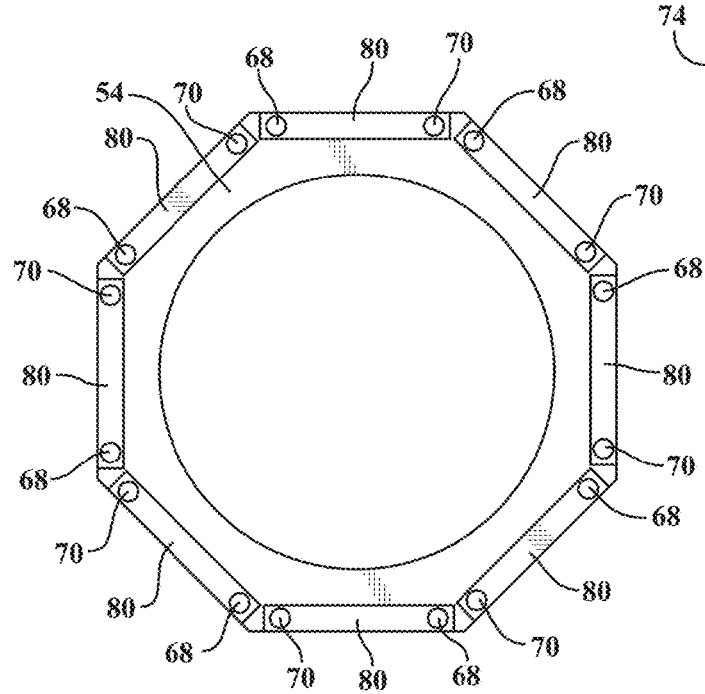
FIG. 4 is a side plan view of another exemplary vehicle motor housing having a plurality of modular manifold units disposed adjacent the vehicle motor housing.
Figure 5A:
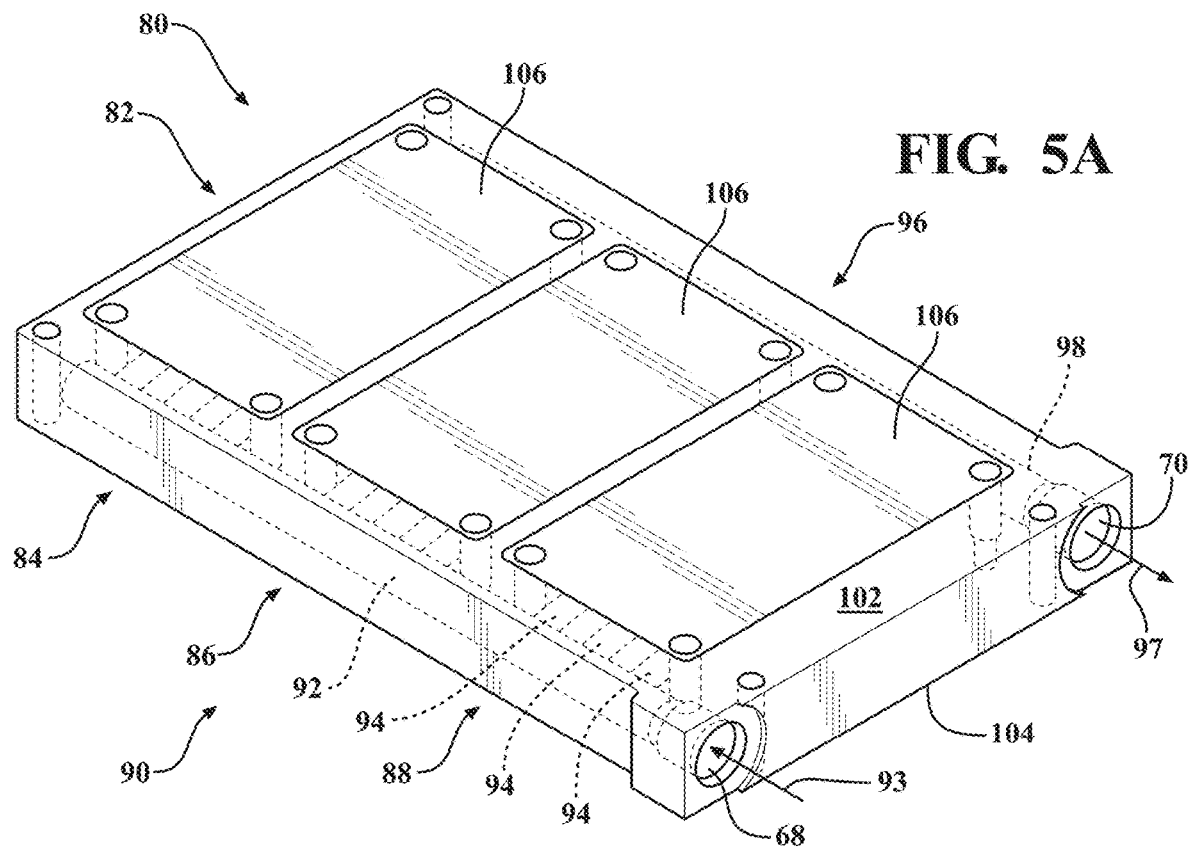
FIG. 5A is an isometric view of an exemplary assembly with a modular manifold unit according to a first aspect.
Figure 6A:
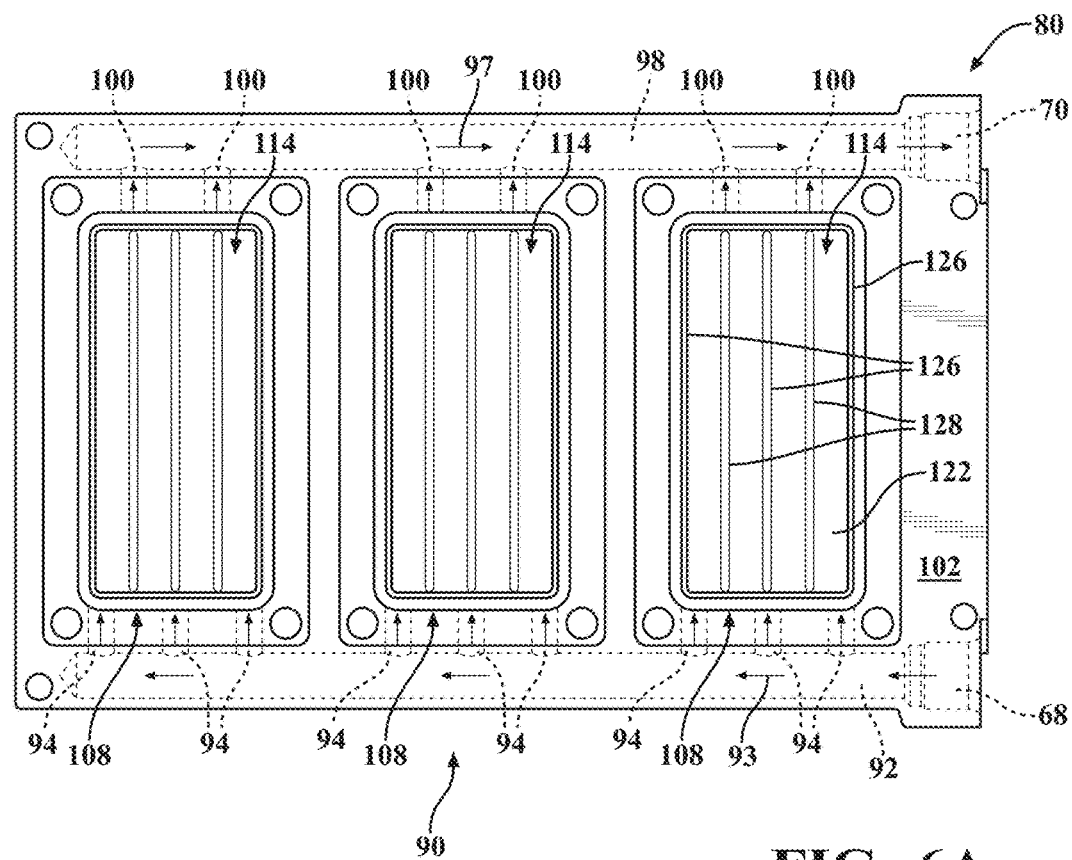
FIG. 6A is a top plan view of the exemplary assembly with the modular manifold unit of FIGS. 5A-5C illustrating a plurality of manifold fluid inserts located in a respective plurality of distribution recesses.

FIG. 4 is a side plan view of another exemplary vehicle motor housing 54 having a plurality of modular manifold units 80 configured to serve as cooling assemblies disposed adjacent the exterior 76 of the vehicle motor housing 54. FIG. 5A is an isometric view of an exemplary assembly with modular manifold unit 80 according to a first aspect that includes a parallel aligned grouping 82 of three modular jet impingement regions 84, 86, 88. The manifold unit 80 has an inlet side 90 with an inlet conduit 92 providing fluid communication in the direction of the fluid path arrow 93 between the coolant fluid inlet 68 and each of the three modular jet impingement regions 84, 86, 88 via respective inlet connection tubes 94. The manifold unit 80 also has an outlet side 96 with an outlet conduit 98 providing fluid communication between the three modular jet impingement regions 84, 86, 88 via respective outlet connection tubes 100 (as best shown in FIG. 6A) to the cooling fluid outlet 70 in the direction of the fluid path arrow 97. The manifold unit defines a first major surface 102 and a second, opposing major surface 104. A plurality of heat transfer or heat sink plates 106 may be provided substantially flush with the first major surface 102. Each major surface 102, 104 may be aligned in thermal coupling communication with a heat generating device, such as a power module 58 or the vehicle motor 52.

Figure 5B:
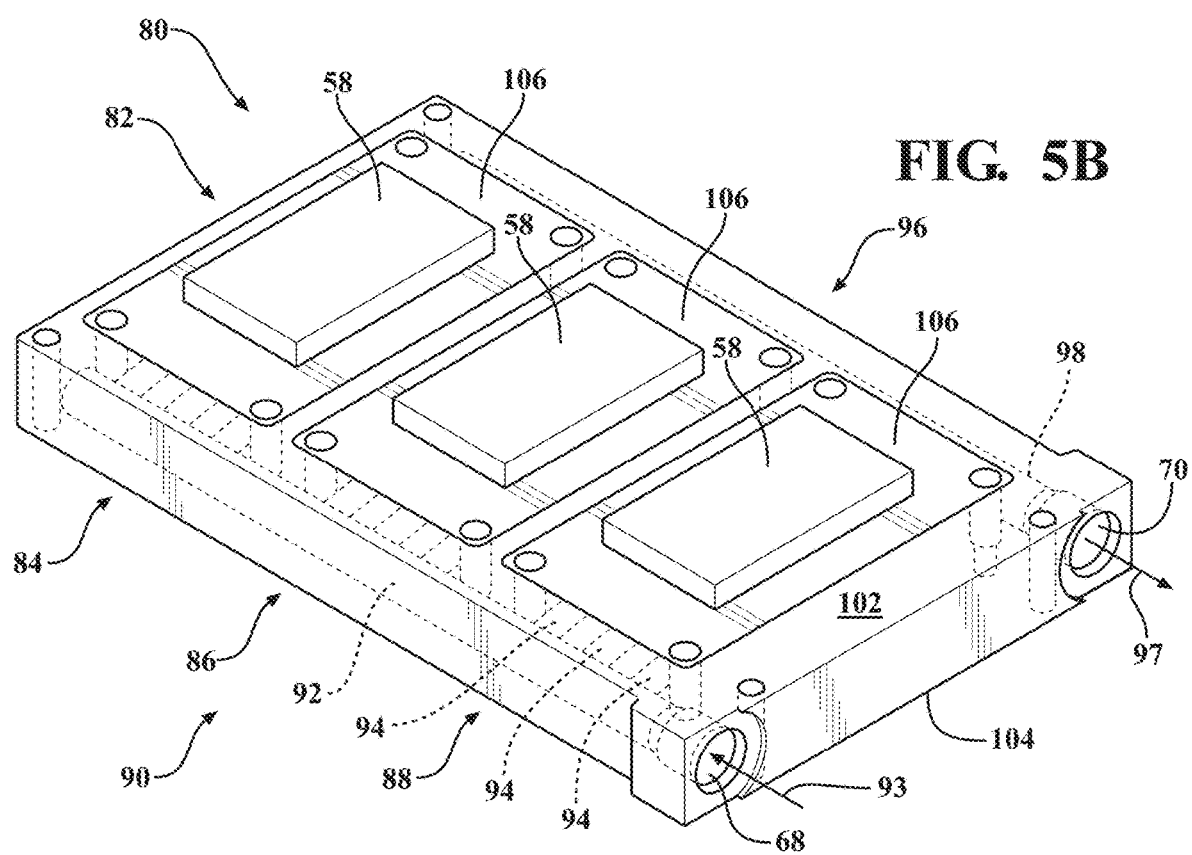
FIG. 5B illustrates the assembly with the modular manifold unit of FIG. 5A having a plurality of power modules thermally coupled thereto.
Figure 5C:
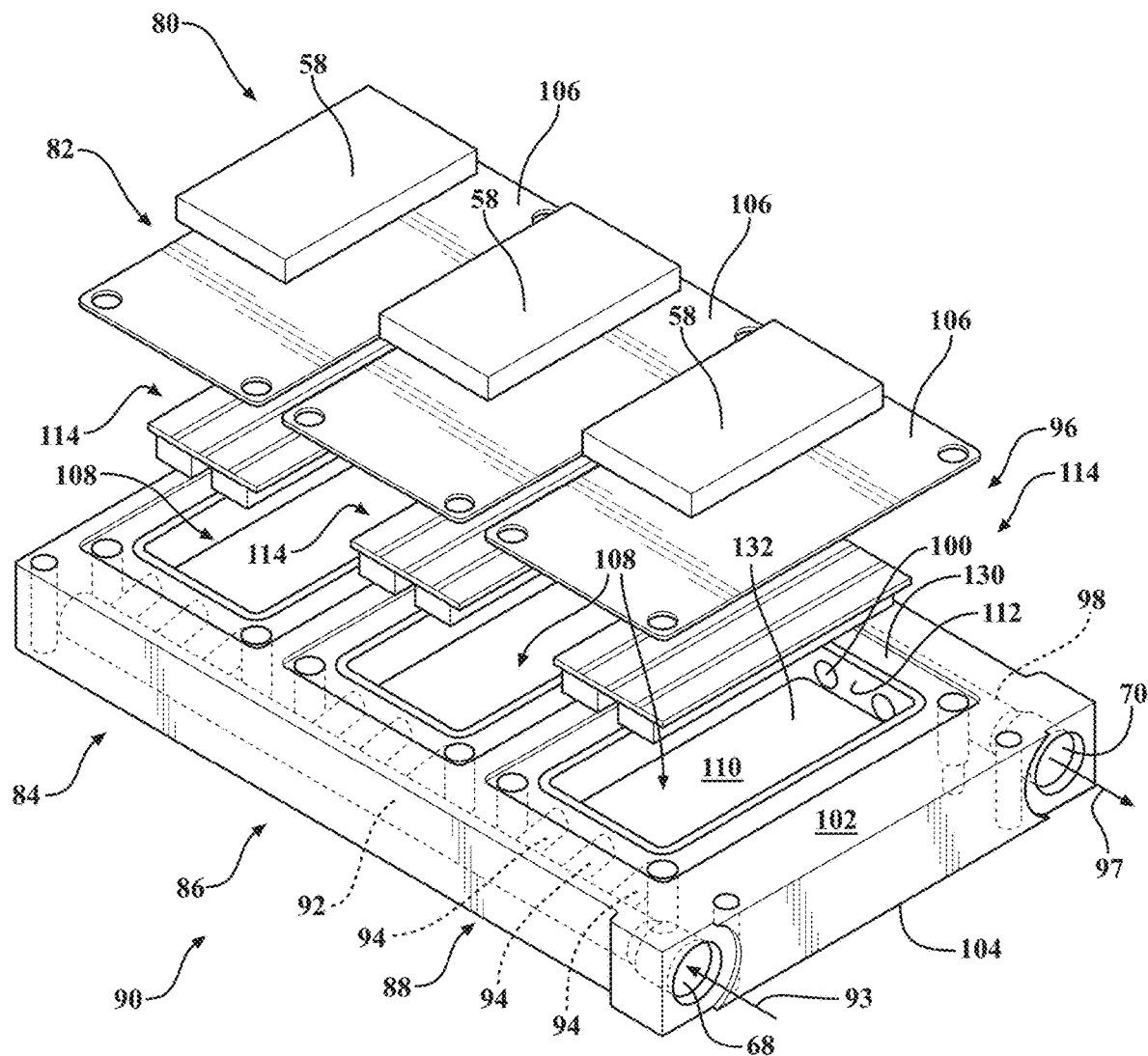
FIG. 5C is an exploded, isometric view of the assembly with the modular manifold unit of FIG. 5B.

FIG. 5B illustrates the assembly with the modular manifold unit 80 of FIG. 5A with a plurality of power modules 58 thermally coupled thereto, and FIG. 5C is an exploded, isometric view of the assembly with the modular manifold unit 80 of FIG. 5B. As shown in FIG. 5C, each impingement region 84, 86, 88 defines a distribution recess 108 at least partially defined by a bottom wall 110 and an upstanding perimeter wall 112. In various aspects, the opposing major side of the bottom wall 110 also defines the exterior major surface 104 that may be in thermal coupling communication with a heat generating device. A manifold fluid insert 114 is disposed within each distribution recess. As will be discussed in more detail below, each manifold fluid insert 114 may define a plurality of inlet branch channels 116 and outlet branch channels 118.

Figure 6B:
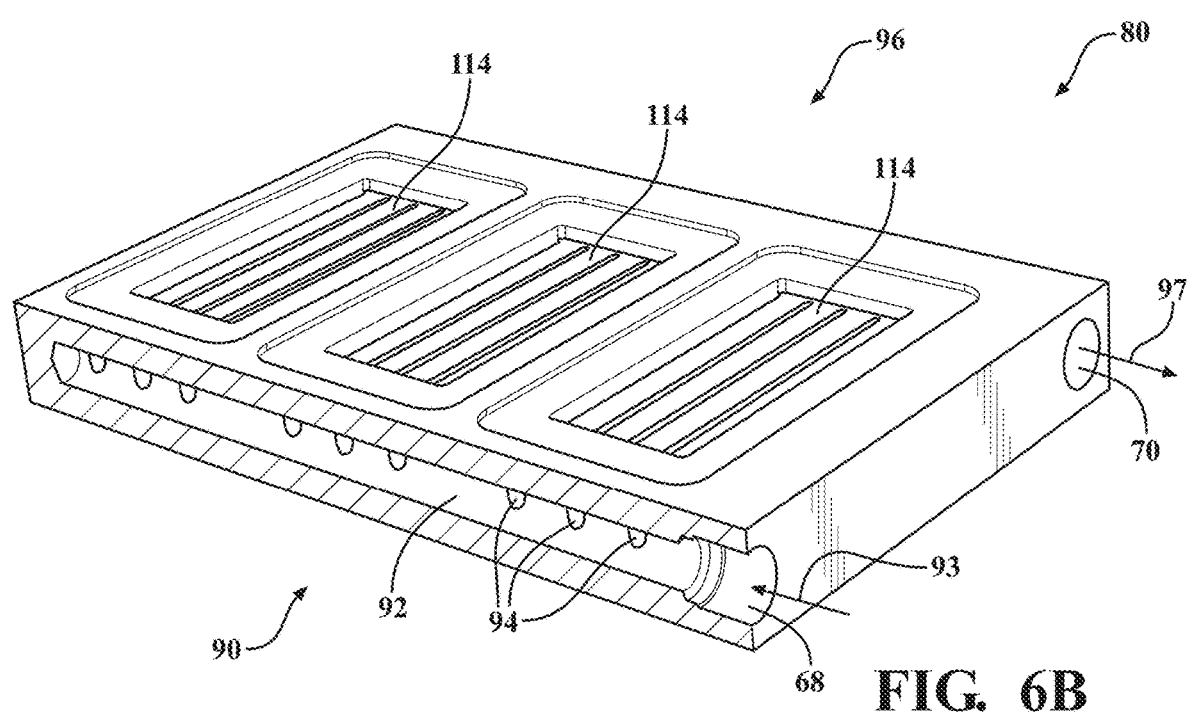
FIG. 6B is an isometric, partial cross-sectional view of the modular manifold unit of FIG. 6A illustrating further details of a cooling fluid inlet conduit.

FIG. 6A is a top plan view of the exemplary modular manifold unit 80 of FIGS. 5A-5C illustrating the plurality of manifold fluid inserts 114 located in a respective plurality of distribution recesses 108 to better show the coolant fluid flow path as indicated by the various directional arrows. FIG. 6B is an isometric, partial cross-sectional view of the modular manifold unit 80 of FIG. 6A illustrating further details of a cooling fluid inlet conduit 92 and inlet connection tubes 94.

Figure 7A:
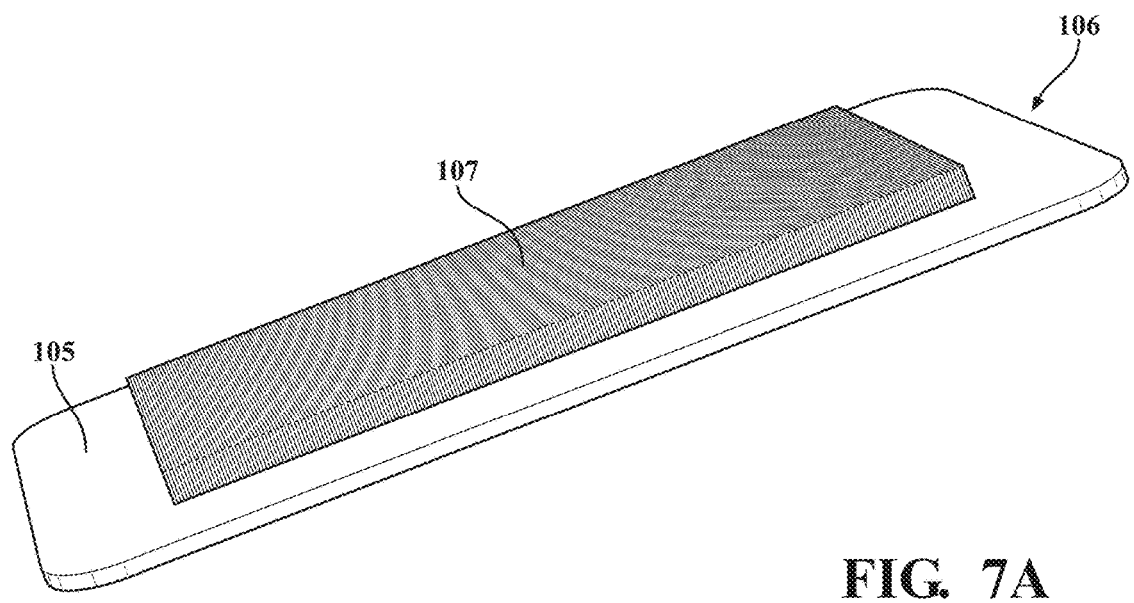
FIG. 7A is a side perspective view of an exemplary heat sink plate with a plurality of aligned fins as a heat sink feature.
Figure 7B:
FIG. 7B is a side plan view of the exemplary heat sink plate and heat sink feature of FIG. 7A.

FIG. 7A is a side perspective view of an exemplary heat sink plate 106, rotated 180 degrees from that shown in FIGS. 5A-5C and illustrating a heat sink feature including a plurality of aligned fins 107. FIG. 7B is a side plan view of the exemplary heat sink plate 106 and plurality of aligned fins 107 as shown in FIG. 7A. It should be understood that various different heat sink features may be used with the present technology, such as a plurality of pins, microchannel arrays, or the like, arranged in a suitable manner or alignment, so as to dissipate heat using a jet impingement process with the cooling fluid.

Figure 8A:
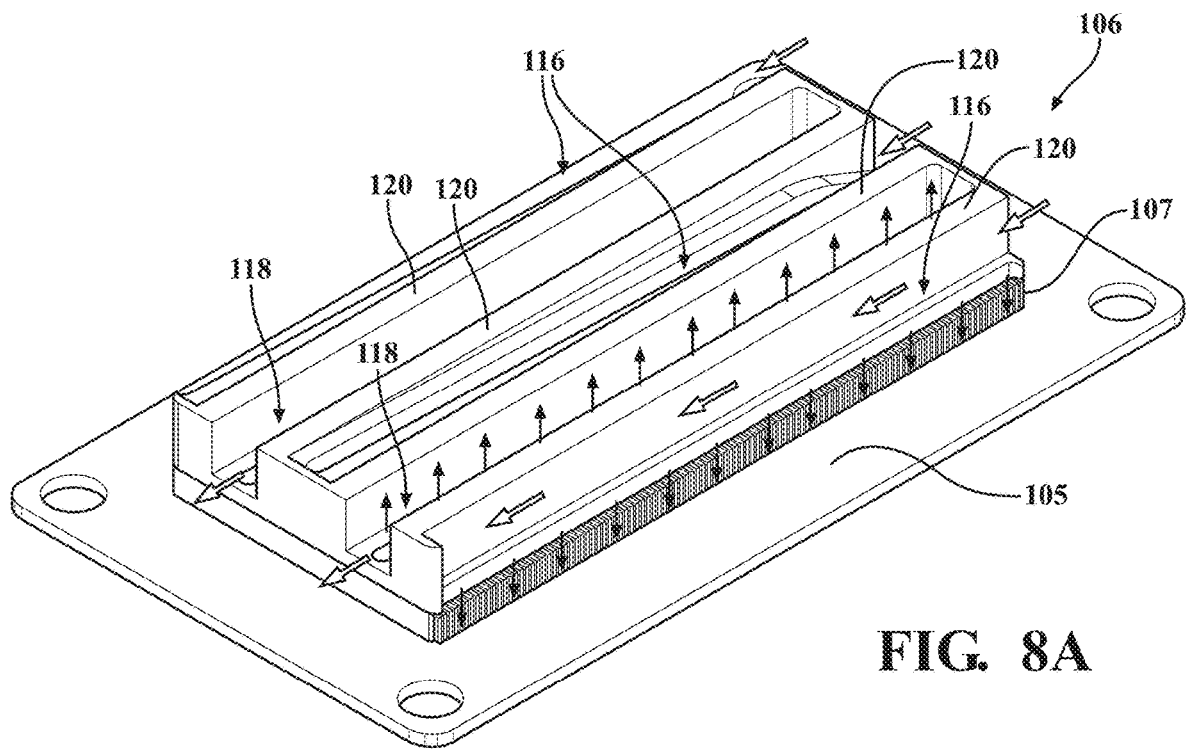
FIG. 8A is an isometric view of an exemplary manifold fluid insert with inlet and outlet branch channels disposed adjacent a heat sink feature and a heat sink plate according to a first aspect.
Figure 8B:
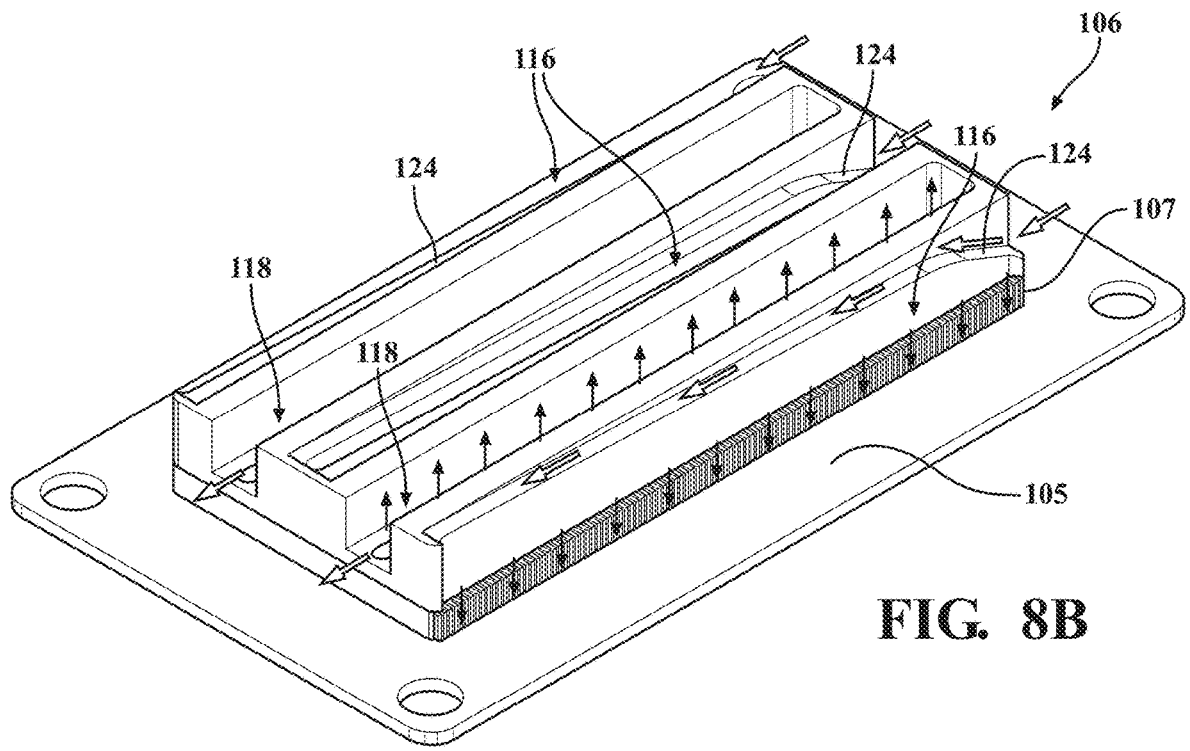
FIG. 8B is an isometric view of an exemplary manifold fluid insert with tapered inlet branch channels walls disposed adjacent a heat sink feature and a heat sink plate according to a second aspect.

FIGS. 8A-8B illustrate isometric views of exemplary manifold fluid inserts 114 with one or more inlet branch channels 116 and one or more outlet branch channels 118, with the manifold fluid inserts 114 being disposed adjacent a heat sink feature 120 and a heat sink plate 106 according to a first and second aspect.

As specifically shown, each manifold fluid insert 114 defines three inlet branch channels 116 and two outlet branch channels 118, with the coolant path as designated by the directional arrows. The inlet branch channels 114 are fluidly coupled to the one or more angled inlet connection tubes 94 when the individual manifold fluid insert 114 is positioned within the distribution recess 108 of the respective individual impingement region 84, 86, 88, thereby defining a portion of the inlet coolant fluid flow path 93. The one or more outlet branch channels 118 are fluidly coupled to the one or more outlet connection tubes 100 when the individual manifold fluid inserts 114 are positioned within the respective distribution recesses 108 of the individual impingement region 84, 86, 88, thereby defining another portion of the outlet coolant fluid flow path 97. The one or more inlet branch channels 114 and the one or more outlet branch channels 116 may be alternately positioned within the manifold fluid insert 114 such that each inlet branch channel 116 is positioned adjacent at least one outlet branch channel 118, and each outlet branch channel 118 is positioned adjacent at least one inlet branch channel 116. Further, the manifold fluid inserts 114 may define a channel surface 120 positioned proximate the bottom wall 110 of the distribution recess 108 when the manifold fluid insert 114 is disposed within the distribution recess 108 and a slot surface 122 (FIGS. 9A-9B) positioned proximate the heat sink feature of the heat sink plate 106 when the heat sink plate 106 is coupled to the modular manifold unit 80.

In some aspects, for example the aspect depicted in FIG. 8B, the one or more of the inlet branch channels 116 define one or more tapered portions 124. For example, a tapered portion 124 may be aligned with the one or more angled inlet connection tubes 94 and may be configured to alter the mass flow rate of coolant fluid traversing the fluid flow path. Further, in other aspects, one or more of the outlet branch channels 118 may also comprise one or more tapered portions. It should be understood that the one or more inlet branch channels 116 and the one or more outlet branch channels 118 may take a variety of configurations including having a variety of slopes, lengths, discontinuous portions, non-linear portions, and the like without departing from the scope of the present technology.

Figure 9A:
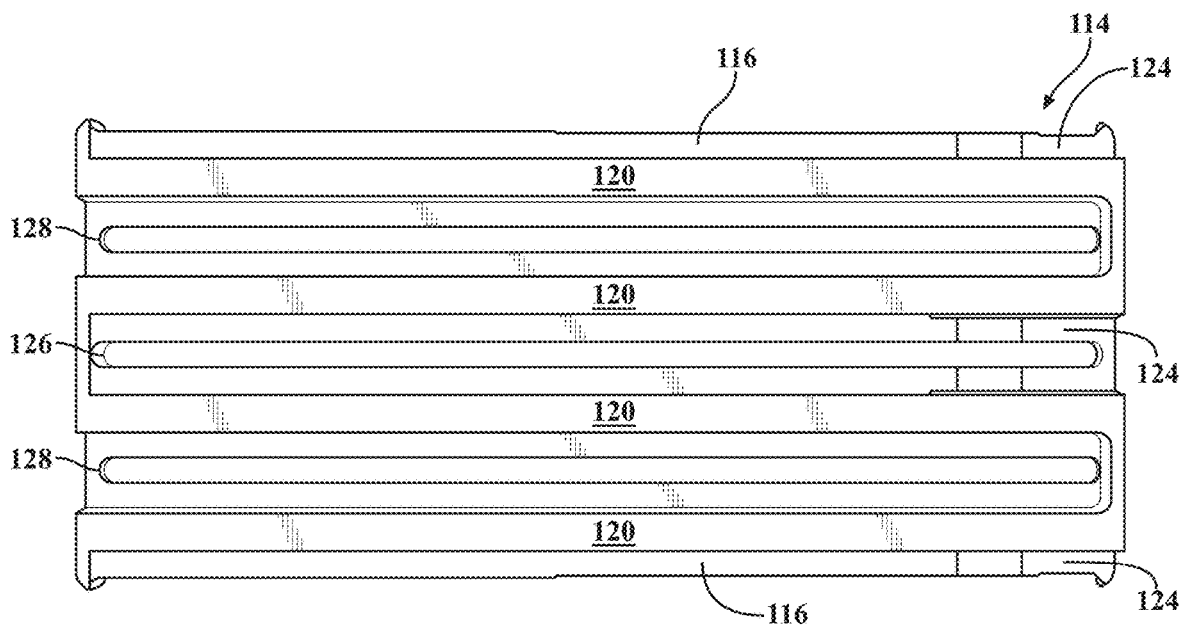
FIG. 9A is a bottom plan view of the manifold fluid insert according to one aspect.
Figure 9B:
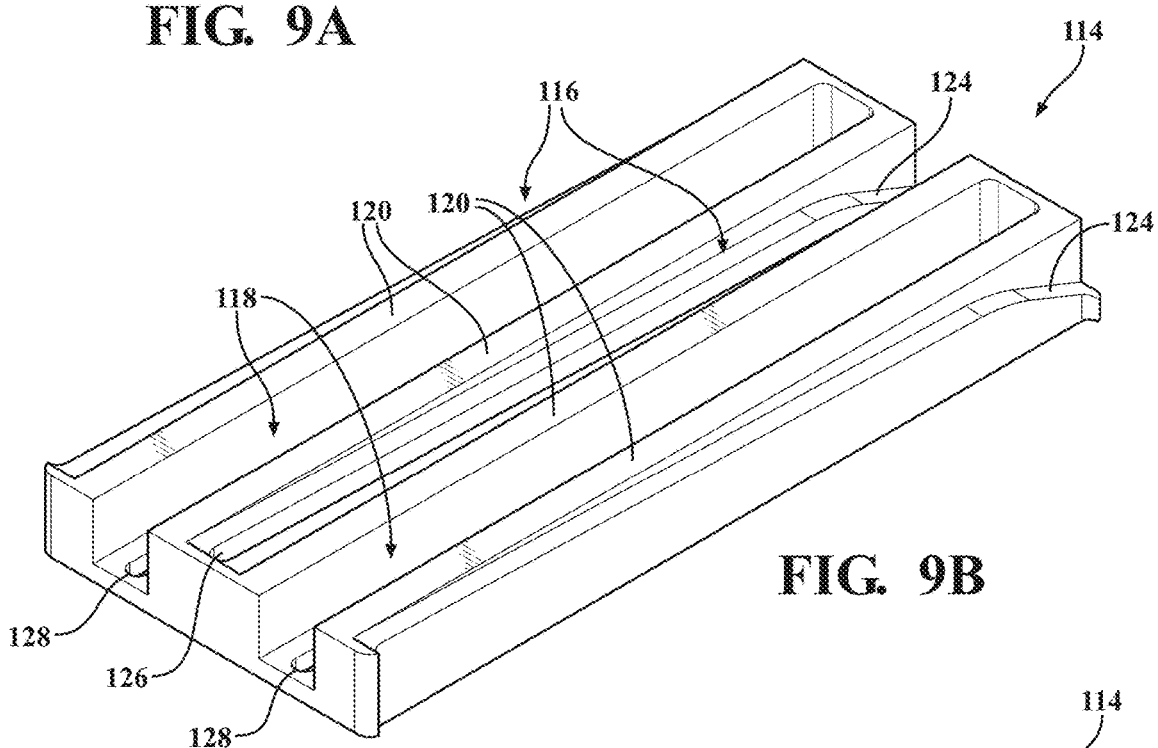
FIG. 9B is an isometric view showing the bottom of the manifold fluid insert of FIG. 9A.
Figure 9C:
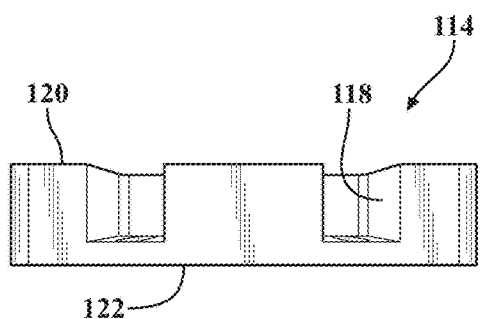
FIG. 9C is a side perspective view showing the outlet branch channels of the manifold fluid insert of FIG. 9A.
Figure 9D:
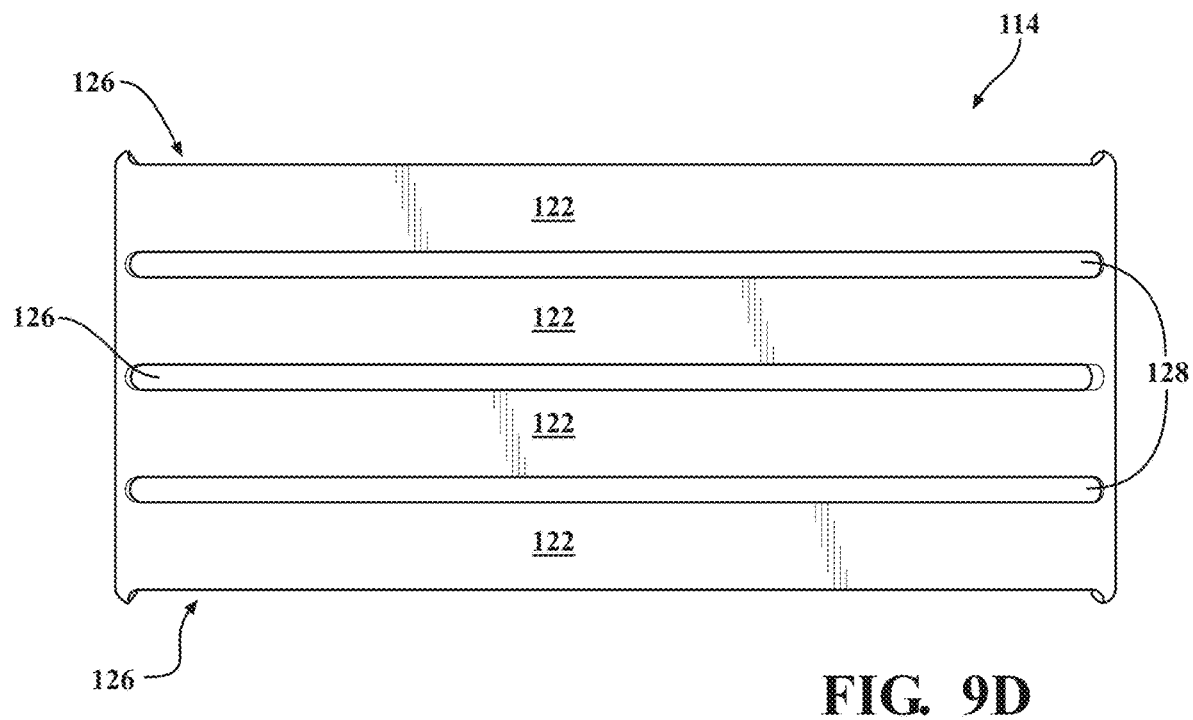
FIG. 9D is a top plan view of an exemplary manifold fluid insert of FIG. 9A.
Figure 9E:
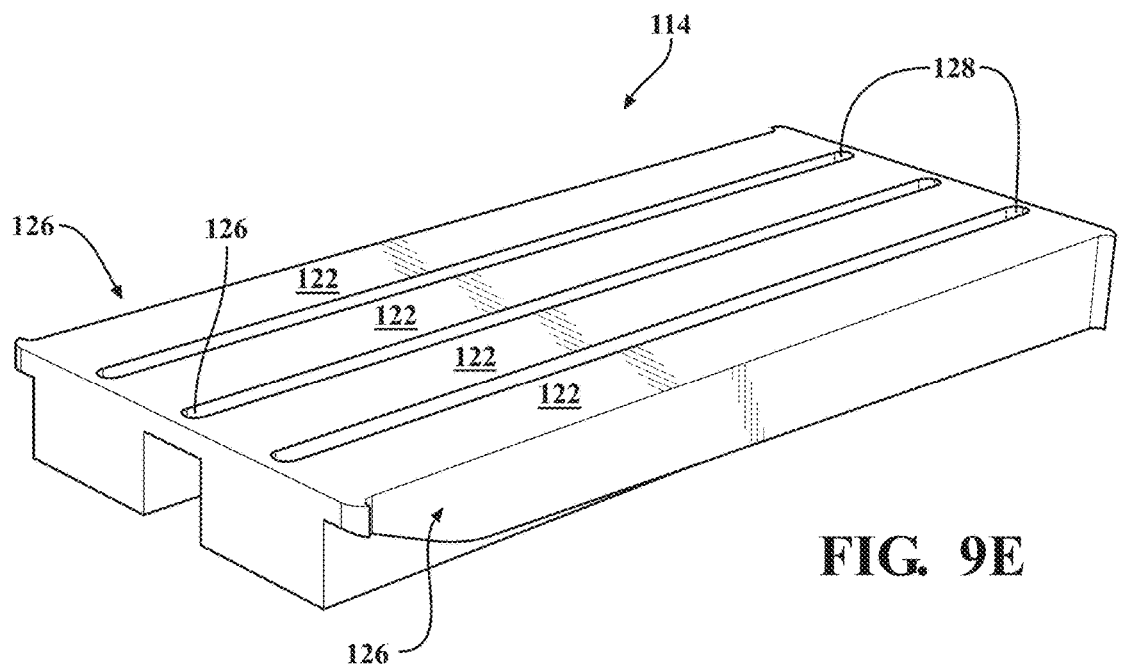
FIG. 9E is an isometric view showing the top of the manifold fluid insert of FIG. 9A.

FIGS. 9A-9E illustrate various views of an exemplary manifold fluid insert 114. FIG. 9A is a bottom plan view of the manifold fluid insert 114, and FIG. 9B is an isometric view showing the bottom of the manifold fluid insert 114. FIG. 9C is a side perspective view, further showing the outlet branch channels 118 of the manifold fluid insert 114. FIG. 9D is a top plan view of a manifold fluid insert 114 defining a plurality of impinging slots 126, and FIG. 9E is an isometric view showing the top of the manifold fluid insert 114.

As shown in FIGS. 9D-9E, the manifold fluid inserts 114 further define one or more impinging slots 126 fluidly coupled to the one or more inlet branch channels 116 and may form a throughput portion of the manifold fluid insert 114 such that coolant fluid may pass through the impinging slot 126, for example, as jets of coolant fluid. The impinging slots 126 may define uniform or non-uniform shapes and cross-sectional areas and may take a variety of sizes and shapes to provide jets of coolant fluid to impinge the heat sink plate 106, and transfer heat from the heat sink plate 106 to the coolant fluid, as described in more detail below. In operation, the impinging slots 126 facilitate jet impingement from the manifold fluid inserts 114 to the heat sink plates 106.

With continued reference to FIGS. 9A through 9E, the manifold fluid inserts 114 further define one or more collecting slots 128 fluidly coupled to the one or more outlet branch channels 116 and may form additional throughput portions of the manifold fluid insert 114 such that coolant fluid may pass through the collecting slots 128. The collecting slots 128 are in fluid communication with the impinging slots 126 such that coolant fluid that exits the manifold fluid insert 114 through an individual impinging slot 126 reenters the manifold fluid insert 114 through an individual collecting slot 128, for example, an adjacent collecting slot 128. The collecting slots 128 may define uniform or non-uniform shapes and cross-sectional areas, and may take a variety of sizes and shapes to collect coolant fluid after it impinges the heat sink feature of the heat sink plate 106 and transfer heat from the heat sink plate 106.

Referring back to FIG. 5A, the modular manifold unit 80 may include one or more heat sink plates 106 coupled to the one or more impingement regions. It should be understood that any number of impingement regions 84, 86, 88 and any number of heat sink plates 106 are contemplated. For example, in some embodiments, two or more heat sink plates 106 may be coupled to an individual impingement region 84, 86, 88 and in other embodiments, an individual heat sink plate 106 may be coupled to two or more impingement regions 84, 86, 88. The heat sink plates 106 may be made from a thermally conductive material, for example and without limitation, copper, aluminum, steel, thermally enhanced composite materials, polymeric composite materials, graphite, or the like.

Referring back to FIG. 7A, each individual heat sink plate 106 may define an impingement surface 105 having the array of fins 107 that extend towards the slot surface 122 of the manifold fluid insert 114 removably positioned within the respective distribution recess 108. The array of fins 107 may be proximate to the manifold fluid insert 114, and in some embodiments, the array of fins 107 may contact the slot surface 122 of the manifold fluid insert 114. As shown in FIG. 5C, the heat sink plate 106 may be positioned within a heat sink plate receiving portion 130 of the distribution recess 108. The impingement surface 105, including the array of fins 107, extends towards the manifold fluid insert 114 such that the array of fins 107 are positioned proximate the impinging slots 126 and the collecting slots 128 of the manifold fluid insert 114, forming an impingement chamber there between. In another aspect, another heat sink feature, such as a heat sink plate 106, with or without a plurality of fins or pins, microchannel array, or the like, may also be positioned within the distribution recess 108 such that the heat sink plate 106 is adjacent the bottom wall 110, ultimately in thermal communication with the vehicle motor 52. In this regard, the manifold fluid insert 114 would be sandwiched between two heat sink plates 106, and any other heat sink features there between. In yet another aspect, the bottom wall 110 defining the distribution recess 108 may be provided with an interior major surface 132, opposite the exterior major surface 104, that is integrated or coupled with a heat sink feature. In still other aspects, the bottom wall 110 may itself be a heat sink feature or heat sink/transfer plate.

In operation, the array of fins 107 receives coolant fluid from the impinging slots 126 and the array of fins 107 directs coolant fluid toward the collecting slots 128. For example, in some embodiments, the impingement surface 105 may further include one or more grooves that may direct coolant fluid flow through the impingement chamber. The one or more grooves may be positioned within the array of fins 107. For example, the one or more grooves may run substantially parallel and proximate the impinging slots 126 and the collecting slots 128 of the manifold fluid insert 114 and may direct coolant fluid between impinging slots 126 and collecting slots 128. The heat sink plate 106 may be coupled to the heat sink plate receiving portion 130 through any appropriate connection, creating a fluid-tight seal between the respective impingement region 84, 86, 88 and the heat sink plate 106, forming the respective impingement chamber therebetween. Example connections include, but are not limited to, gaskets and mechanical fasteners, o-rings, soldering, brazing, ultrasonic welding, and the like. As described in more detail below, the one or more arrays of fins 107 can correspond to the locations of the one or more heat generating devices, such as power modules, positioned proximate the heat sink plate 107.

Any gaskets used may be made from a variety of materials that provide a fluid-tight seal between generally non-compliant bodies. Examples of such materials include, without limitation, natural or synthetic elastomers, compliant polymers such as silicone, and the like. The one or more gaskets may also be made from an assembly that includes compliant materials and non-compliant materials, such that the one or more gaskets provide desired sealing characteristics while maintaining their geometric configuration. In other embodiments, gaskets are not utilized, such as embodiments where soldering or brazing is used to couple the heat sink plates 106.

Referring again to FIG. 7A, the one or more arrays of fins 107 increase the local surface area of the heat sink plate 106, such that coolant fluid delivered to the heat sink plate 106 may efficiently convect heat away from the heat sink plate 106. By increasing the surface area of the heat sink plate 106, the heat transfer rate from the heat sink plate 106 to the coolant fluid may be enhanced. In some embodiments, the heat sink plate 106, including the one or more arrays of fins 107, may have a variety of configurations including being made from uniform, isotropic materials, non-isotropic materials, composite materials, or the like. In some embodiments, the one or more arrays of fins 107 of the heat sink plate 106 may include a coating, for example, a porous coating, that increases the surface area of the one or more arrays of fins 107, thereby increasing heat transfer away from the heat sink plate 106. In some embodiments, the one or more arrays of fins 107 may be constructed from a porous material. Additionally, it should be understood that in some embodiments, the heat sink plates 106 may not be provided with the one or more arrays of fins 107.

Figure 10:
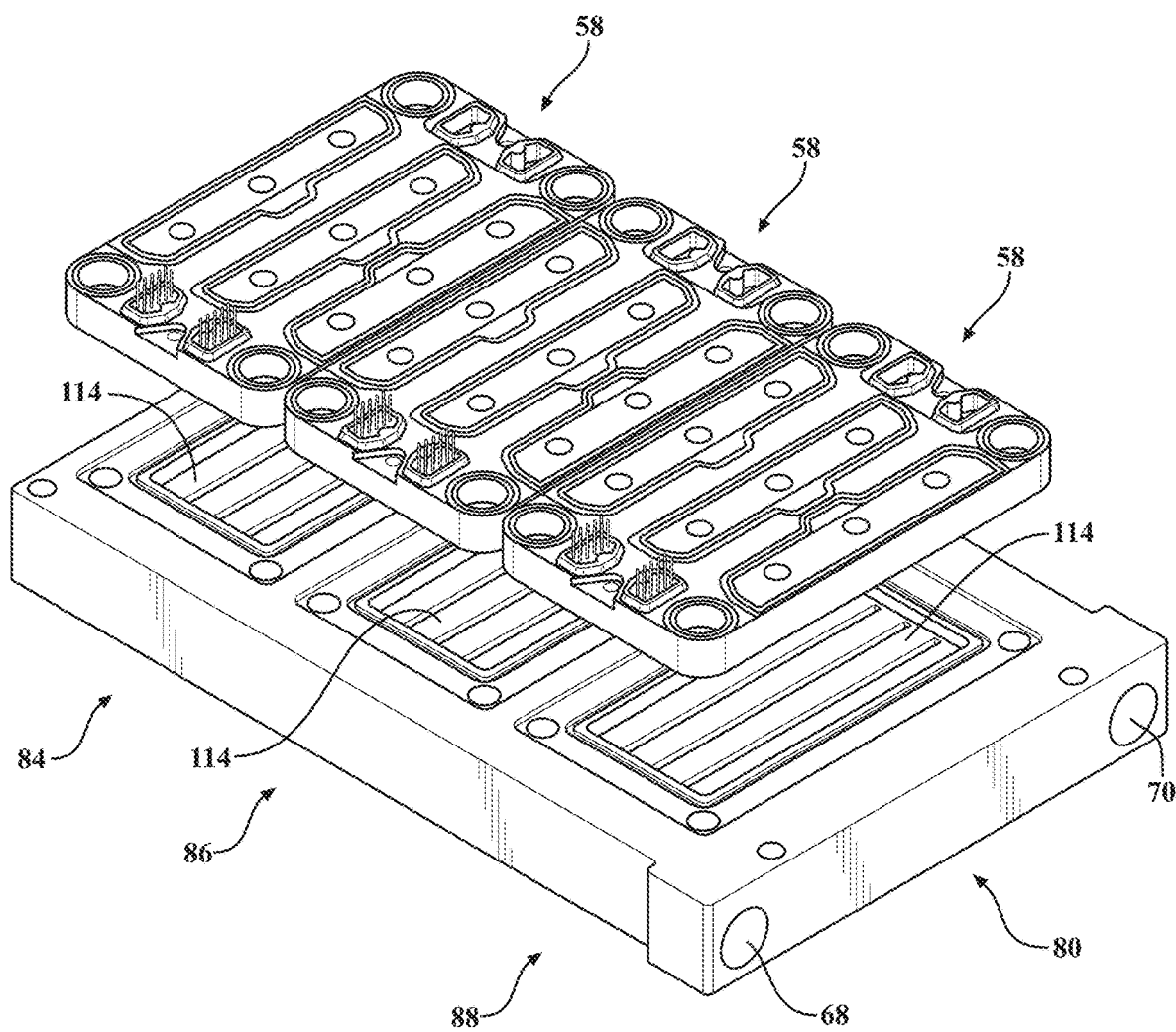
FIG. 10 is a partially exploded, isometric view of an exemplary assembly with a modular manifold unit according to a second aspect.
Figure 11:
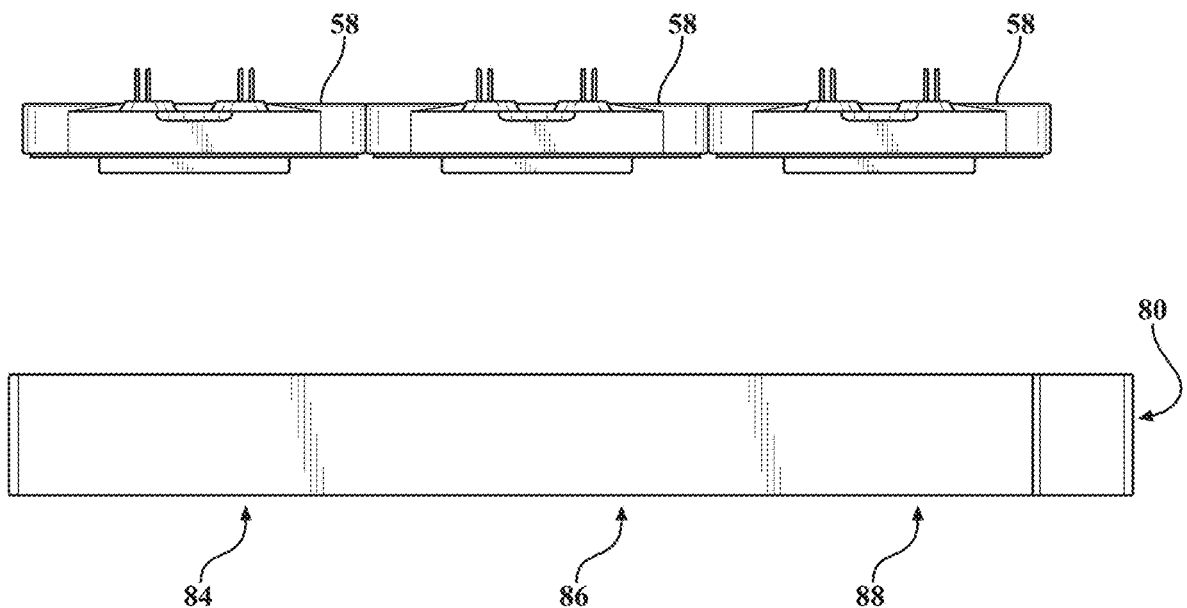
FIG. 11 is a side plan view of the exploded view of the assembly with the modular manifold unit of FIG. 10.
Figure 12:
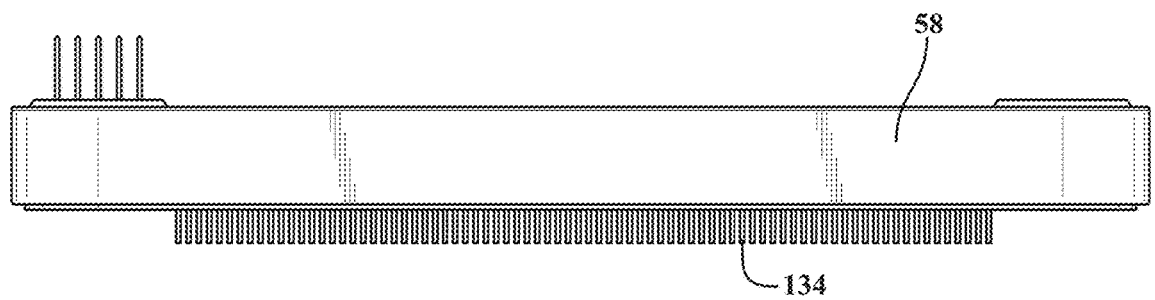
FIG. 12 is a side plan view of an exemplary power module with an integrated heat sink feature.

FIG. 10 is a partially exploded, isometric view of an exemplary assembly with a modular manifold unit 80 according to another aspect, where at least one heat sink feature is integrated directly with, or directly coupled to, one or more power modules 58 without the use of a separate heat sink plate 106 being located between the power module 58 and manifold fluid insert 114 as otherwise shown in FIGS. 5B-5C. FIG. 11 is a side plan view of the exploded view of the modular manifold unit 80 of FIG. 10, and FIG. 12 is a side plan view of an exemplary power module 58 with an integrated heat sink feature. As shown, the power module 58 may be provided with an integrated heat sink feature 134, for example, an array of fins or pins coupled directly or indirectly to, and in thermal communication with, the power module 58. As shown, the integrated heat sink feature 134 may be similar in size and shape to the set of fins 107 provided with the heat sink plate 106 as shown in FIGS. 7A-7B, and configured to work with the manifold fluid insert 114.

Figure 13:
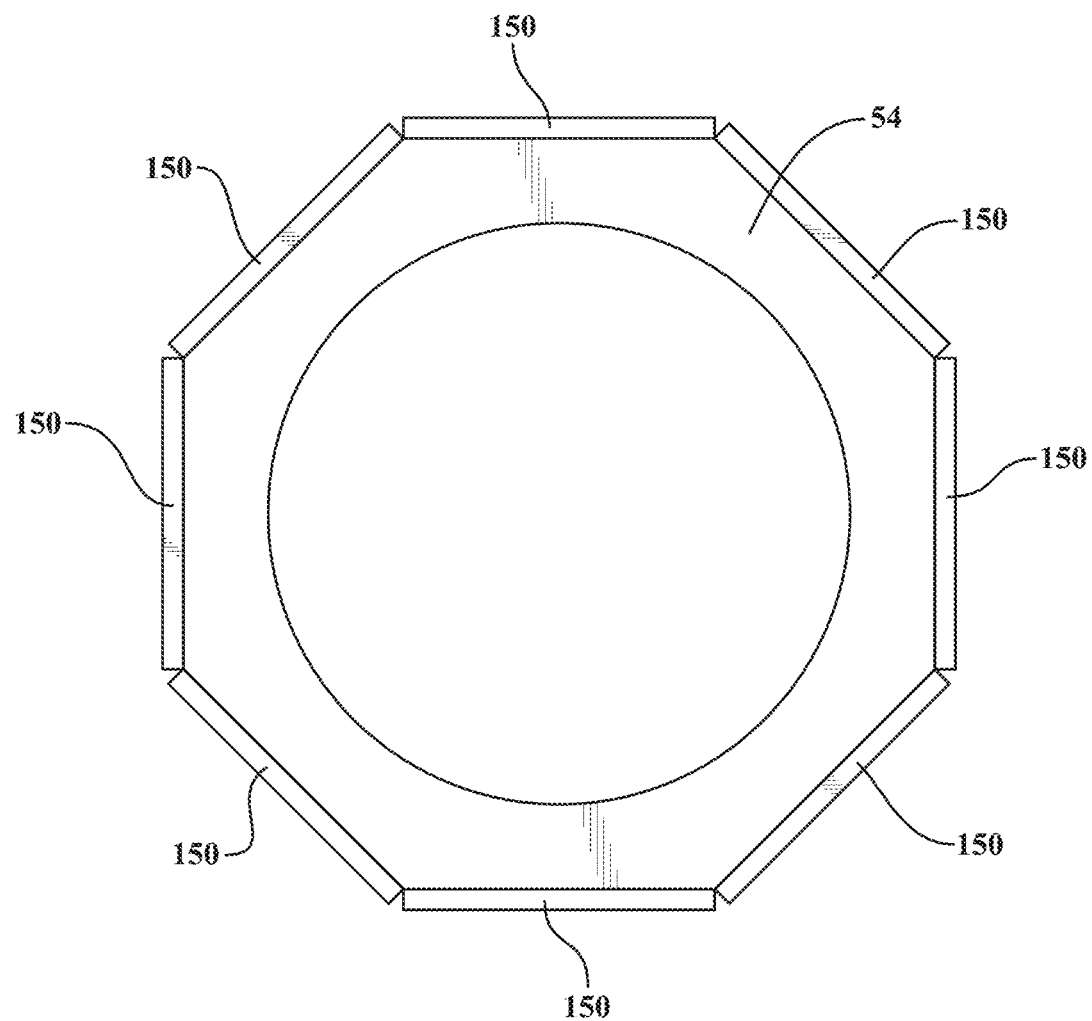
FIG. 13 is a side plan view of another exemplary vehicle motor housing having a modular cooling system with a plurality of layered assemblies disposed adjacent the vehicle motor housing.
Figure 14:
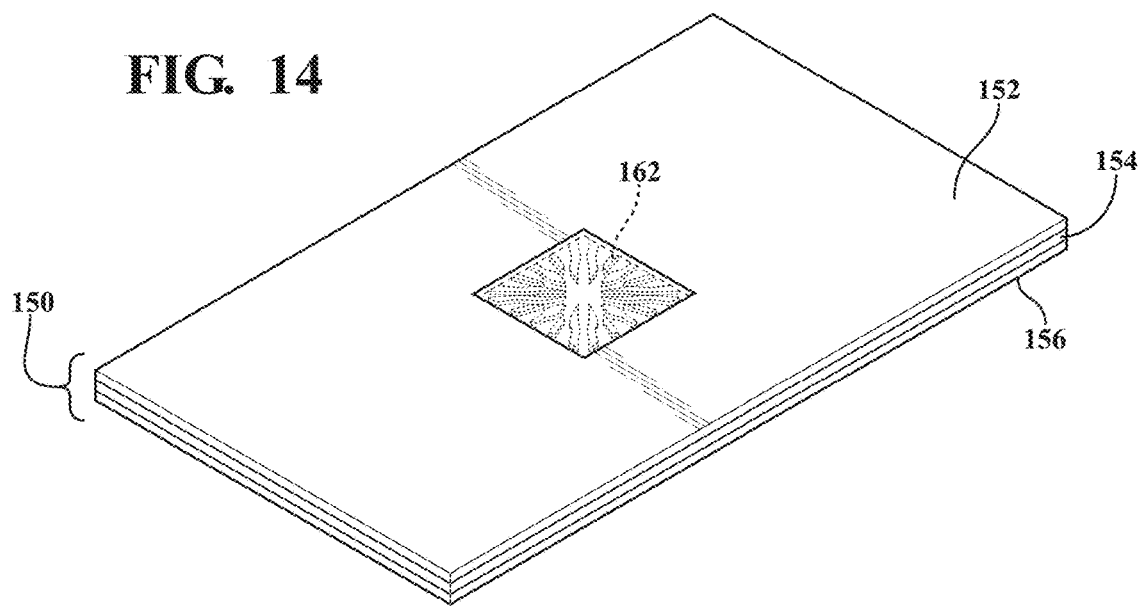
FIG. 14 is an isometric view of an exemplary layered cooling assembly as shown in FIG. 13.
Figure 15:
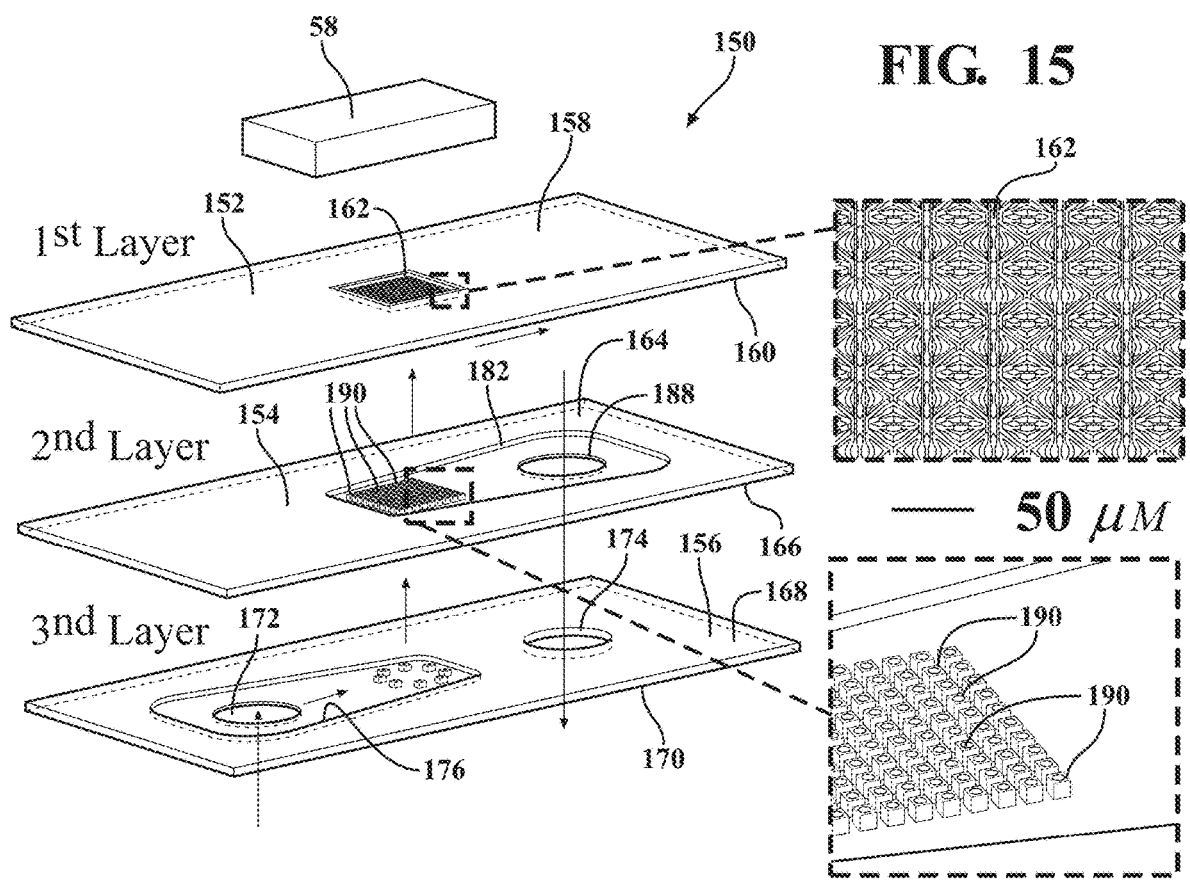
FIG. 15 is an exploded, isometric view of the layered cooling assembly of FIG. 14.

FIG. 13 is a side plan view of another exemplary vehicle motor housing 54 having a modular cooling system with a plurality of layered cooling assemblies 150 disposed adjacent the vehicle motor housing 54 for simultaneously cooling both a power module 58 and a vehicle motor 52. FIG. 14 is an isometric view of an exemplary layered cooling assembly 150 as shown in FIG. 13, and FIG. 15 is an exploded, isometric view of the layered cooling assembly 150 showing the relationship between three layers 152, 154, and 156. It should be understood that while the assemblies 150 are shown with a generally rectangular shape, other shapes and designs are well within the scope of the present technology. Similarly, while three layers are specifically shown, alternate designs may use additional or fewer layers, and it is also envisioned that the particular integration of a plurality of layers can also be accomplished using 3-D printing technology to create a single layer having the same features, such as the coolant paths, resulting from the assembled layered combination of three different substantially planar structures. The layers 152, 154, 156 may comprise similar thermally conductive materials as those discussed above with respect to the heat sink plate 106.

Figure 16:
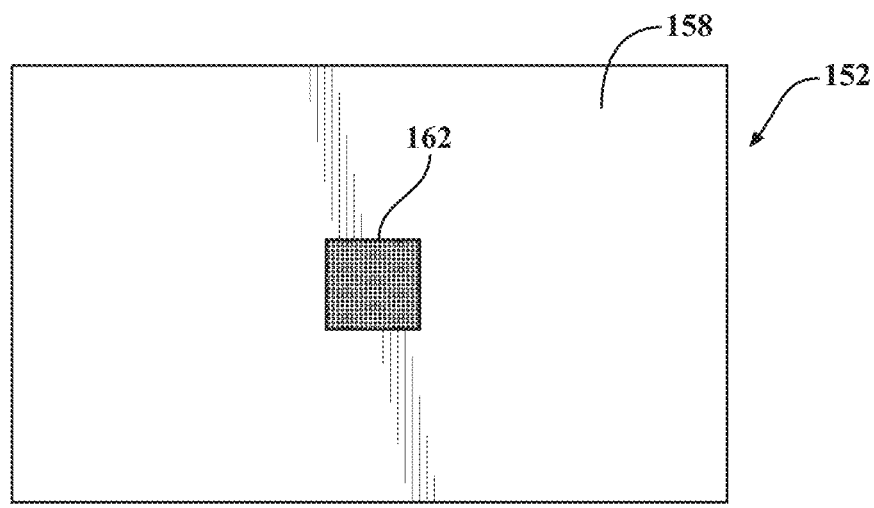
FIG. 16 is a top plan view of a first layer of the layered cooling assembly of FIG. 14.
Figure 17:
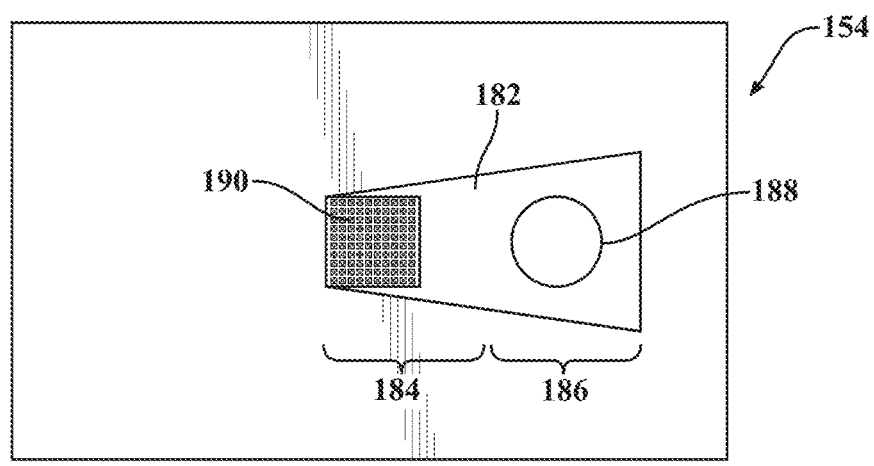
FIG. 17 is a top plan view of a second layer of the layered cooling assembly of FIG. 14.
Figure 18:
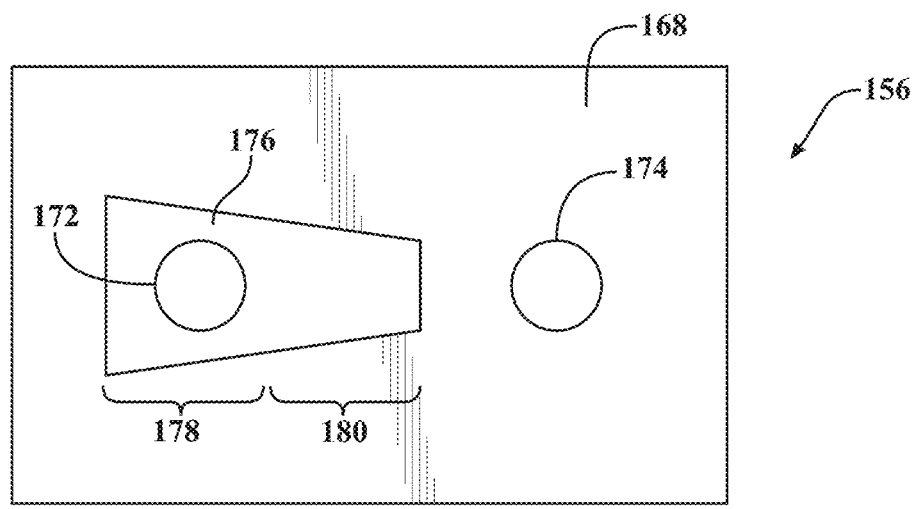
FIG. 18 is a top plan view of a third layer of the layered cooling assembly of FIG. 14.

FIG. 16 is a top plan view of a first layer 152 of the layered cooling assembly 150, FIG. 17 is a top plan view of a second layer 154 of the layered cooling assembly 150, and FIG. 18 is a top plan view of a third layer 156 of the layered cooling assembly 15 of FIG. 14.

FIGS. 15 and 16 illustrate details of the first layer 152 defining an upper major surface 158 and a lower opposing major surface 160. The upper major surface 158 of the first layer 152 includes at least one heat sink feature 162 that is configured to be in thermal communication with either one of a power module 58 (as shown) and the vehicle motor 52 (not shown).

FIGS. 15 and 17 illustrate details of the second layer 154 defining an upper major surface 164 and a lower opposing major surface 166, the upper major surface 164 of the second layer 154 being located adjacent to the lower major surface 160 of the first layer 152 in the assembled state.

FIGS. 15 and 18 illustrate details of the third layer 156 defining an upper major surface 168 and a lower opposing major surface 170, the upper major surface 168 of the third layer 156 being located adjacent to the lower major surface 166 of the second layer 154, and the lower major surface 170 of the third layer 156 being in thermal communication with either one of the power module 58 and the vehicle motor 52 in the assembled state.

As shown, the bottom layer, or the third layer 156, defines a cooling fluid inlet 172 and a cooling fluid outlet 174. Further details of the coolant fluid circuit prior to entry in the inlet 172 and after exiting the outlet 174 are not shown for simplicity, and will depend on whether the third layer 156 is intended to be in thermal communication with the vehicle motor 52 or the power module 58. For ease in understanding, the description that follows will be based on a first aspect where the first layer 152 is in thermal communication with a power module 58, and the third layer is in thermal communication with a vehicle motor 52. If it is desirable to provide an assembly with the reverse configuration, one of ordinary skill in the art would be able to make the appropriate modifications.

The upper major surface 168 of the third layer 156 defines a recessed fluid channel 176 therein. Coolant fluid passing through the recessed channel 176 will be in thermal communication with the heat generating device, such as a vehicle motor, located adjacent the lower major surface 170 of the third layer 156. As shown, the shape of the fluid channel 176 may be substantially trapezoidal, beginning with a larger width outer region 178 near the cooling fluid inlet 172 and leading to a smaller or narrower width inner region 180 in a direction towards the center area of the layer 156. The upper major surface 164 of the second layer 154 also defines a recessed fluid channel 182 therein. Similarly, the shape of the fluid channel 182 of the second layer 154 may also be substantially trapezoidal in shape, having a narrower width inner region 184 near a center area of the layer 154, leading to a larger width outer region 186 defining a cooling fluid outlet 188, which is in fluid communication with the cooling fluid outlet 174 of the third layer 156 in an assembled state. As best shown in FIG. 15, the inner region 184 of the second layer 154 may include a plurality of impingement orifices 190 fluidly coupled with the recessed fluid channel 176 of the third layer 156 and configured to direct jets of coolant fluid to the heat sink feature 162 of the first layer 152 that is in thermal communication with a power module 58. In various aspects, the heat sink feature 162 may include a microchannel array, or the like, configured to receive jets of coolant fluid and remove heat from an adjacent heat generating device.

In the assembled state, the first layer 152, the second layer 154, and the third layer 156 are aligned and positioned in a stacked arrangement and are configured to cooperate to provide a flow of coolant fluid from a fluid inlet 172, defined in the third layer 156, through the recessed channel 176 and to a first region 184 of the second layer 154. The coolant fluid passes through the jet impingement orifices 190 directed to the heat sink feature 162 disposed in the first layer 152. The coolant fluid is further directed back to the recessed channel 182 of the second layer 154 and through an outer region 186 of the recessed channel 182 of the second layer 154 to the fluid outlets 188, 174 in the respective second and third layers, 154, 156.

Figure 19:
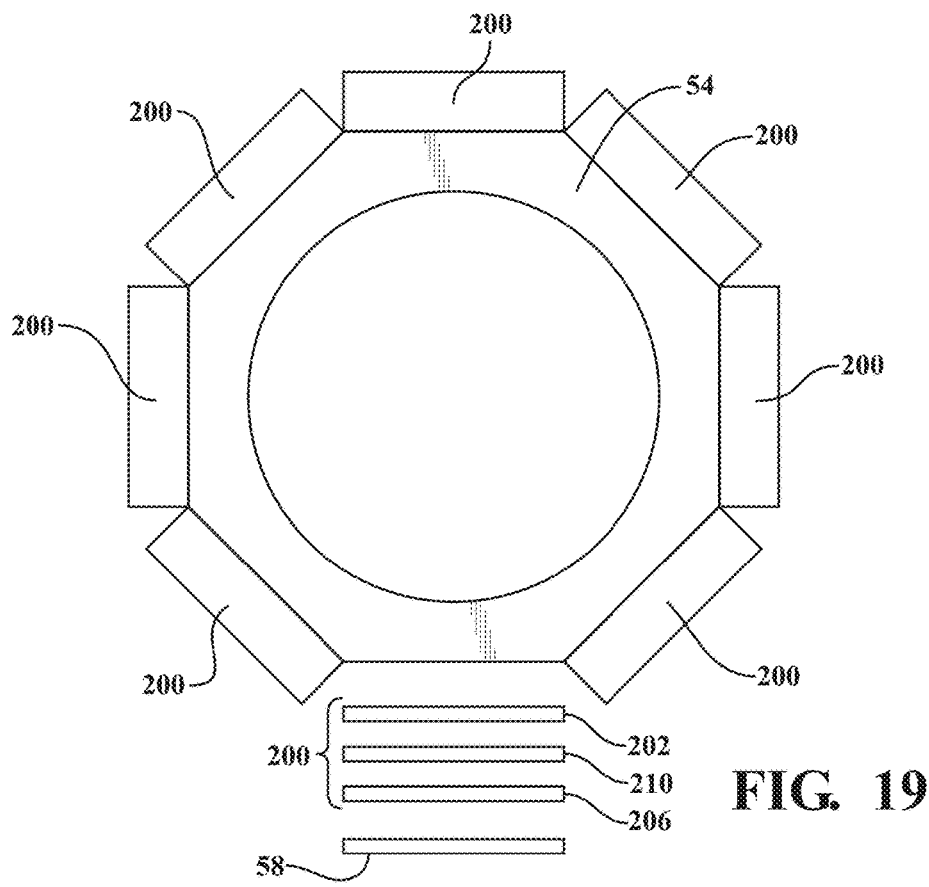
FIG. 19 is a side plan view of another exemplary vehicle motor housing having a modular cooling system with a plurality of cooling assemblies disposed adjacent the vehicle motor housing.
Figure 20:
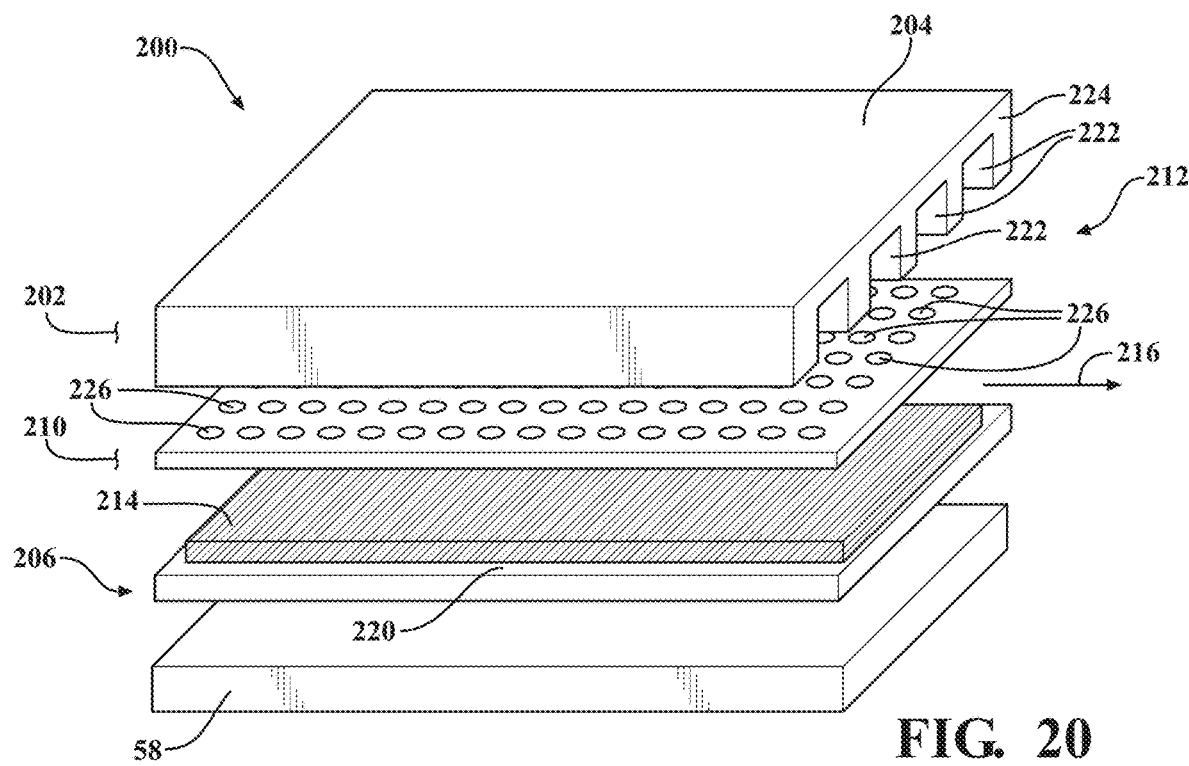
FIG. 20 is an exploded, isometric view of an exemplary cooling assembly of FIG. 19.

FIG. 19 is a side plan view of another exemplary vehicle motor housing 54 having a modular cooling system with a plurality of cooling assemblies 200 disposed adjacent the vehicle motor housing. FIG. 20 is an exploded, isometric view of one of the exemplary cooling assemblies of FIG. 19. In various aspects, the cooling assembly 200 is provided with a first cooling structure 202 defining at least one major exterior heat transfer surface 204 in thermal communication with the vehicle motor, via the housing. A second cooling structure 206 is provided, defining at least one major exterior heat transfer surface 208 in thermal communication with a power module 58. An interlayer structure 210 is provided, disposed between the first cooling structure 202 and the second cooling structure 206, and may be optionally configured to couple the first cooling structure 202 to the second cooling structure 206.

In an assembled state, the first cooling structure 202, the second cooling structure 206, and the interlayer structure 210 are positioned in a stacked arrangement, defining a coolant flow path therein. For example, the cooling assembly 200 is configured to provide a flow of coolant fluid from a fluid inlet area 212, shown being provided by the first cooling structure 202, through the interlayer structure 210, and to at least one heat sink feature 214 of the second cooling structure 206. The coolant fluid may further be directed through a fluid outlet area 216, shown being provided by the second cooling structure 206.

As stated with respect to other aspects of the technology, further details of the coolant fluid circuit prior to entry in the fluid inlet area 212 and after exiting the fluid outlet are 216 are not shown for simplicity, and will depend on various other design considerations that one of ordinary skill in the art would be able to make with the appropriate modifications.

As shown in FIG. 20, the heat sink feature 216 of the second cooling structure 206 may include a plurality of fins, pins, or a microchannel array, or the like, that is ultimately in thermal communication with the power module 58 (FIG. 19). In various aspects, the bottom portion 218 of the second structure 206 may include an impingement surface 220 and serve as a heat sink/transfer plate.

The first cooling structure 202 is in thermal communication with a housing 54 of the vehicle motor 52 and, as shown, defines a plurality of channels 222, which ultimately provide a plurality of apertures defined in a side wall 224 of the first cooling structure configured to direct the coolant fluid across the first cooling structure 202 and ultimately toward the interlayer structure. The shapes and sizes of the channels, apertures, and other conduits may vary based on design considerations.

The interlayer structure 210 may be provided with a plurality of jet impingement orifices 226 configured to direct jets of coolant fluid to the heat sink feature 214 of the second cooling structure 206. The heat sink feature 214 may be provided with a suitable geometry to work with the bottom portion 218 of the second structure 206 to direct the coolant fluid to the fluid outlet area.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

As used herein, the term "vehicle" should be construed having a broad meaning, and should include all types of vehicles, with non-limiting examples including a passenger car, truck, motorcycle, off-road vehicle, bus, boat, airplane, helicopter, lawn mower, recreational vehicle, amusement park vehicle, farm vehicle, construction vehicle, tram, golf cart, train, or trolley, etc.

For purposes of this disclosure, the term "coupled" (and its variants) generally means the joining of two components directly or indirectly to one another. For example, the joining can be stationary in nature or movable in nature. The joining may be achieved with the two components, and any additional intermediate members or components being integrally formed as a single unitary body with one another or with the two components. Such joining may be permanent in nature or may be movable or releasable in nature, unless otherwise stated.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A modular cooling system for simultaneously cooling both a power module and a vehicle motor, the modular cooling system including a plurality of layered assemblies, each layered assembly comprising:
   a first layer defining upper and lower opposing major surfaces, the upper major surface of the first layer comprising a heat sink feature in thermal communication with one of the power module and the vehicle motor;
   a second layer defining upper and lower opposing major surfaces, the upper major surface of the second layer being located adjacent to the lower major surface of the first layer and defining a recessed fluid channel therein; and
   a third layer defining upper and lower opposing major surfaces, the upper major surface of the third layer being located adjacent to the lower major surface of the second layer and defining a recessed fluid channel therein, and the lower major surface of the third layer being in thermal communication with the other of the power module and the vehicle motor,
   wherein the first layer, the second layer, and the third layer are positioned in a stacked arrangement and configured to provide a flow of coolant fluid from a fluid inlet, defined in the third layer, through an inner region of the second layer, and to the heat sink feature located in the first layer, wherein the coolant fluid is further directed back through a fluid outlet defined in an outer region of the recesses fluid channel of the second layer and through a fluid outlet defined in the third layer that is directly aligned with the fluid outlet of the second layer.

2. The modular cooling system according to claim 1, wherein the recessed fluid channel defined in the upper major surface of the third layer provides fluid communication between the fluid inlet and the inner region of the second layer.

3. The modular cooling system according to claim 2, wherein the recessed fluid channel defined in the upper major surface of the third layer provides thermal communication between the flow of coolant fluid and the power module or the vehicle motor.

4. The modular cooling system according to claim 1, wherein the recessed fluid channel defined in the upper major surface of the second layer provides fluid communication between the inner region and outer region of the second layer.

5. The modular cooling system according to claim 4, wherein the inner region of the second layer comprises a plurality of impingement orifices fluidly coupled to the recessed fluid channel of the third layer and configured to direct jets of coolant fluid to the heat sink feature of the first layer.

6. The modular cooling system according to claim 5, wherein the heat sink feature comprises a microchannel array.

7. The modular cooling system according to claim 1, wherein the upper major surface of the first layer is in thermal communication with the power module and the lower major surface of the third layer is in thermal communication with the vehicle motor.

8. The modular cooling system according to claim 1, wherein the third layer defines each of the fluid inlet and the fluid outlet as one or more apertures extending between the upper and lower major surfaces of the third layer.

9. A modular cooling system for simultaneously cooling both a power module and a vehicle motor, the system comprising:
   a vehicle motor;
   a plurality of power modules;
   a plurality of modular layered assemblies disposed between the respective power modules and the vehicle motor, each layered assembly comprising:
      a first layer defining upper and lower opposing major surfaces, the upper major surface of the first layer comprising at least one heat sink feature in thermal communication with one of the power module and the vehicle motor;
      a second layer defining upper and lower opposing major surfaces, the upper major surface of the second layer being located adjacent to the lower major surface of the first layer and defining a trapezoidal shaped recessed fluid channel therein; and
      a third layer defining upper and lower opposing major surfaces, the upper major surface of the third layer being located adjacent to the lower major surface of the second layer and defining a trapezoidal shaped recessed fluid channel therein, and the lower major surface of the third layer being in thermal communication with the other of the power module and the vehicle motor,
   wherein the first layer, the second layer, and the third layer are positioned in a stacked arrangement and configured to provide a flow of coolant fluid from a fluid inlet, defined in the third layer, through an inner region of the second layer, and to the heat sink feature located in the first layer, wherein the coolant fluid is further directed back through a fluid outlet defined in an outer region of the recessed fluid channel of the second layer and through a fluid outlet defined in the third layer that is directly aligned with the fluid outlet of the second layer.

* * * * *

UNITED STATES PATENT AND TRADEMARK OFFICE
CERTIFICATE OF CORRECTION

PATENT NO.        : 10,700,571 B2
APPLICATION NO.   : 15/836016
DATED             : June 30, 2020
INVENTOR(S)       : Feng Zhou et al.

Page 1 of 1

It is certified that error appears in the above-identified patent and that said Letters Patent is hereby corrected as shown below:

In the Claims

Column 13, Line 33: replace "recesses" with --recessed--

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*